US012705753B2

(12) United States Patent
Lilaonitkul et al.

(10) Patent No.: US 12,705,753 B2
(45) Date of Patent: Aug. 11, 2026

(54) MEDICAL IMAGE ANALYSIS USING NEURAL NETWORKS

(71) Applicant: UCL Business Ltd., London (GB)

(72) Inventors: Watjana Lilaonitkul, London (GB); Adam Dubis, London (GB)

(73) Assignee: UCL Business Ltd., London (GB)

( * ) Notice: Subject to any disclaimer, the term of this patent is extended or adjusted under 35 U.S.C. 154(b) by 247 days.

(21) Appl. No.: 18/285,170

(22) PCT Filed: Mar. 28, 2022

(86) PCT No.: PCT/GB2022/050765
§ 371 (c)(1),
(2) Date: Sep. 29, 2023

(87) PCT Pub. No.: WO2022/208060
PCT Pub. Date: Oct. 6, 2022

(65) Prior Publication Data

US 2024/0185428 A1 Jun. 6, 2024

(30) Foreign Application Priority Data

Mar. 30, 2021 (GB) ..................................... 2104506

(51) Int. Cl.
*G06N 3/0455* (2023.01)
*G06T 7/00* (2017.01)
(Continued)

(52) U.S. Cl.
CPC ............. *G06T 7/12* (2017.01); *G06N 3/0455* (2023.01); *G06T 7/0012* (2013.01); *G06T 7/11* (2017.01);
(Continued)

(58) Field of Classification Search
None
See application file for complete search history.

(56) References Cited

U.S. PATENT DOCUMENTS 438,855 A * 10/1890 Morgan .................. A41B 3/06 223/27
10,123,689 B2 11/2018 Jia et al.
(Continued)

FOREIGN PATENT DOCUMENTS

CN 109727259 A 5/2019
WO 2019/001209 A1 1/2019
(Continued)

OTHER PUBLICATIONS

PCT International Search Report and Written Opinion dated Oct. 21, 2022, in International Appln. No. PCT/GB2022/050765 (20 pages).
(Continued)

*Primary Examiner* — Tsung Yin Tsai
(74) *Attorney, Agent, or Firm* — McCarter & English, LLP

(57) ABSTRACT

Systems and methods are described for automatically determining layer structure from medical image data. A processing device receives image data of biological layers captured by a medical imaging device. The processing device determines a boundary surface score for each pixel of the image data using a neural network, the boundary surface score being representative of a likelihood that each pixel corresponds to a boundary between segmented layers within the image data, to generate data defining boundary surfaces between segmented layers in the image data. In one embodiment, the neural network includes first and second sub-networks connected in series, the first sub-network configured with a multi-scale pooling layer that provides additional filters at respective defined sampling rates. The first sub-network processes the image data to generate segmentation data identifying a plurality of tissue layers in the input medical image, and the second sub-network processes the segmentation data to identify boundary surfaces
(Continued)

between the plurality of tissue layers. Other embodiments are also described and claimed.

20 Claims, 21 Drawing Sheets

(51) Int. Cl.
*G06T 7/11* (2017.01)
*G06T 7/12* (2017.01)

(52) U.S. Cl.
CPC ............... *G06T 2207/10101* (2013.01); *G06T 2207/20016* (2013.01); *G06T 2207/20076* (2013.01); *G06T 2207/20081* (2013.01); *G06T 2207/20084* (2013.01); *G06T 2207/30041* (2013.01); *G06T 2207/30088* (2013.01)

(56) References Cited

U.S. PATENT DOCUMENTS

| | | | | |
|---|---|---|---|---|
| 10,198,832 | B2 | 2/2019 | De Fauw et al. | |
| 10,679,344 | B2 | 6/2020 | Schlegl et al. | |
| 10,722,180 | B2 | 7/2020 | Zhang et al. | |
| 2015/0110381 | A1* | 4/2015 | Parvin | G06V 20/698 382/133 |
| 2019/0205758 | A1* | 7/2019 | Zhu | G06N 3/08 |
| 2021/0241178 | A1* | 8/2021 | Madabhushi | G06N 3/084 |
| 2021/0397966 | A1* | 12/2021 | Sun | G06N 3/0455 |
| 2024/0006056 | A1* | 1/2024 | Yu | G06N 3/045 |

FOREIGN PATENT DOCUMENTS

| | | |
|---|---|---|
| WO | 2019/210079 A1 | 10/2019 |
| WO | 2020/056454 A1 | 3/2020 |

OTHER PUBLICATIONS

PCT Invitation to Pay Additional Fees dated Jun. 30, 2022, in International Appln. No. PCT/GB2022/050765 (12 pages).
Search Report dated Dec. 20, 2021, in United Kingdom Patent Appln. No. GB2104506.7 (5 pages).
Li et al., "DeepRetina: Layer Segmentation of Retina in OCT Images Using Deep Learning", Translational Vision Science & Technology, vol. 9, No. 2, Dec. 2020 (17 pages).
Li et al., "Multi-Scale GCN-Assisted Two-Stage Network for Joint Segmentation of Retinal Layers and Disc in Peripapillary OCT Images", arXiv:2102.04799v1 [eess.IV], Feb. 9, 2021 (17 pages).
He et al. "Topology Guaranteed Segmentation of the Human Retina from OCT using Convolutional Neural Networks", arXiv:1803.05120 [cs.CV],Mar. 14, 2018 (9 pages).
Weninger et al., "Multi-task Learning for Brain Tumor Segmentation", BrainLes 2019, LNCS 11992, May 19, 2020 (11 pages).
Hirsch et al., "An Auxiliary Task for Learning Nuclei Segmentation in 3D Microscopy Images", Proceedings of Machine Learning Research, vol. 121, 2020 (18 pages).
Chennupati et al., "AuxNet: Auxiliary Tasks Enhanced Semantic Segmentation for Automated Driving", arXiv:1901.05808v1 [cs.CV], Jan. 17, 2019 (8 pages).
Liu et al., "Training Compact Neural Networks via Auxiliary Overparameterization", arXiv:1909.02214v1 [cs.CV], Sep. 5, 2019 (17 pages).
Sun et al., "FishNet: A Versatile Backbone for Image, Region, and Pixel Level Prediction", arXiv:1901.03495v1 [cs.CV]. Jan. 11, 2019 (11 pages).
Kugelman et al., "Automatic Choroidal Segmentation in OCT Images using Supervised Deep Learning Methods", Scientific Reports, vol. 9, 13298, Sep. 16, 2019 (13 pages).
Roy at al., "ReLayNet: Retinal Layer and Fluid Segmentation of Macular Optical Coherence Tomography using Fully Convolutional Networks", arXiv:1704.02161v2 [cs.CV], Jul. 7, 2017 (16 pages).
Lu et al., "Cascaded Deep Neural Networks for Retinal Layer Segmentation of Optical Coherence Tomography with Fluid Presence", arXiv:1912.03418v1 [eess.IV], Dec. 7, 2019 (8 pages).
Devalla et al., "DRUNET: A Dilated-Residual U-Net Deep Learning Network to Segment Optic Nerve Head Tissues in Optical Coherence Tomography Images", Biomedical Optics Express, vol. 9, No. 7, Jun. 25, 2018 (22 pages).
Cai et al., "Dense-UNet: A Novel Multiphoton in vivo Cellular Image Segmentation Model based on a Convolutional Neural Network", Quantitative Imaging in Medicine and Surgery, vol. 10, No. 6, May 2020 (11 pages).

* cited by examiner

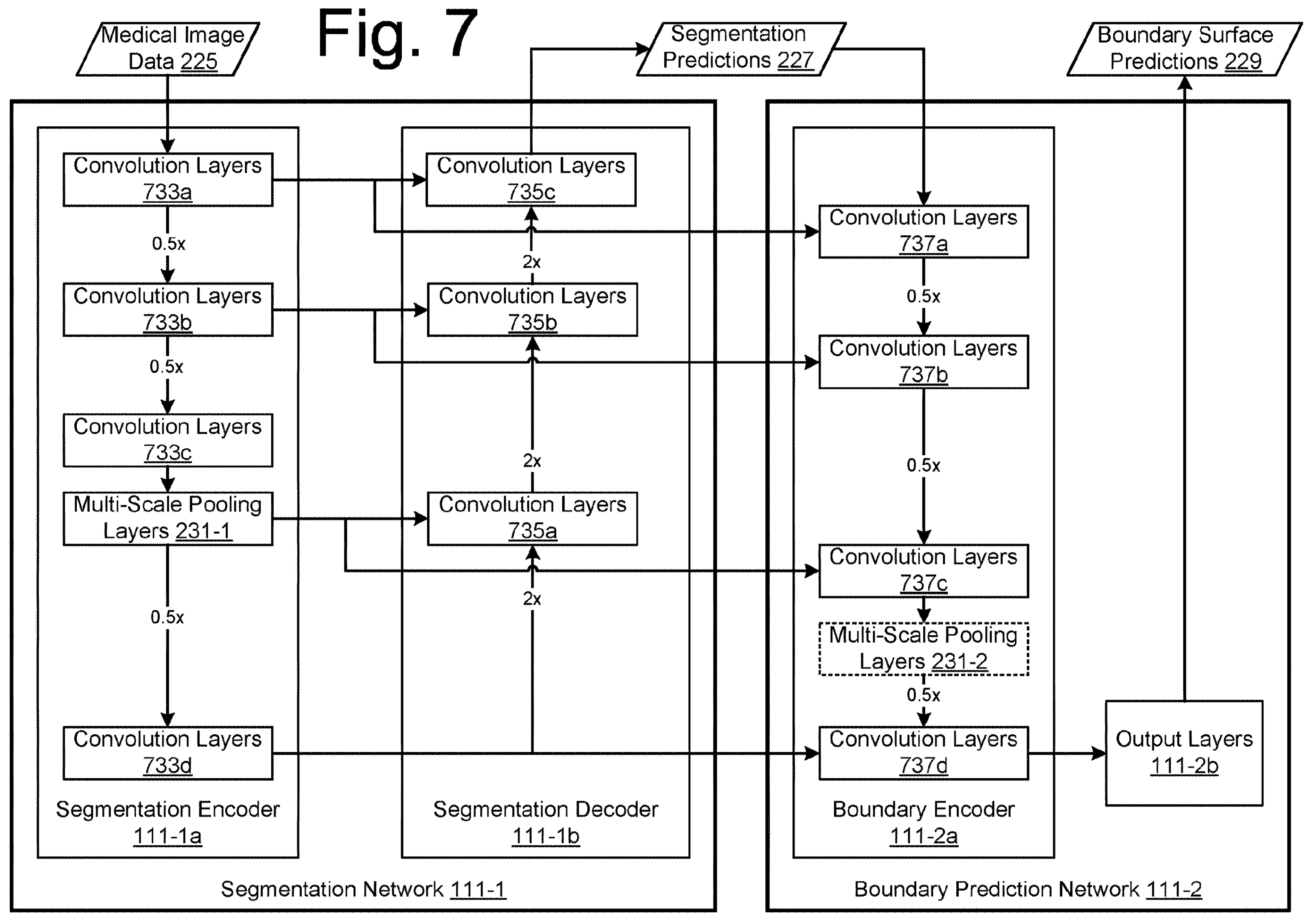
Fig. 7
Medical Image Data 225
Segmentation Predictions 227
Boundary Surface Predictions 229
Convolution Layers 733a
0.5x
Convolution Layers 733b
0.5x
Convolution Layers 733c
Multi-Scale Pooling Layers 231-1
0.5x
Convolution Layers 733d
Segmentation Encoder 111-1a
Convolution Layers 735c
2x
Convolution Layers 735b
2x
Convolution Layers 735a
2x
Segmentation Decoder 111-1b
Segmentation Network 111-1
Convolution Layers 737a
0.5x
Convolution Layers 737b
0.5x
Convolution Layers 737c
Multi-Scale Pooling Layers 231-2
0.5x
Convolution Layers 737d
Boundary Encoder 111-2a
Output Layers 111-2b
Boundary Prediction Network 111-2

Input
Input
HxWxC input
HxWxC input
Concatenation
Batch Normalisation
Capped ReLU
(1 x 1) Convolution Kernel
HxWxC expanded
Batch Normalisation
Capped ReLU
Depthwise (K x K) Convolution Kernel
HxWxC expanded
Batch Normalisation
(1 x 1) Convolution Kernel
HxWxC output
+
(1 x 1) Convolution Kernel
HxWxC output
Skip Connection
Convolution Layers 737
Output

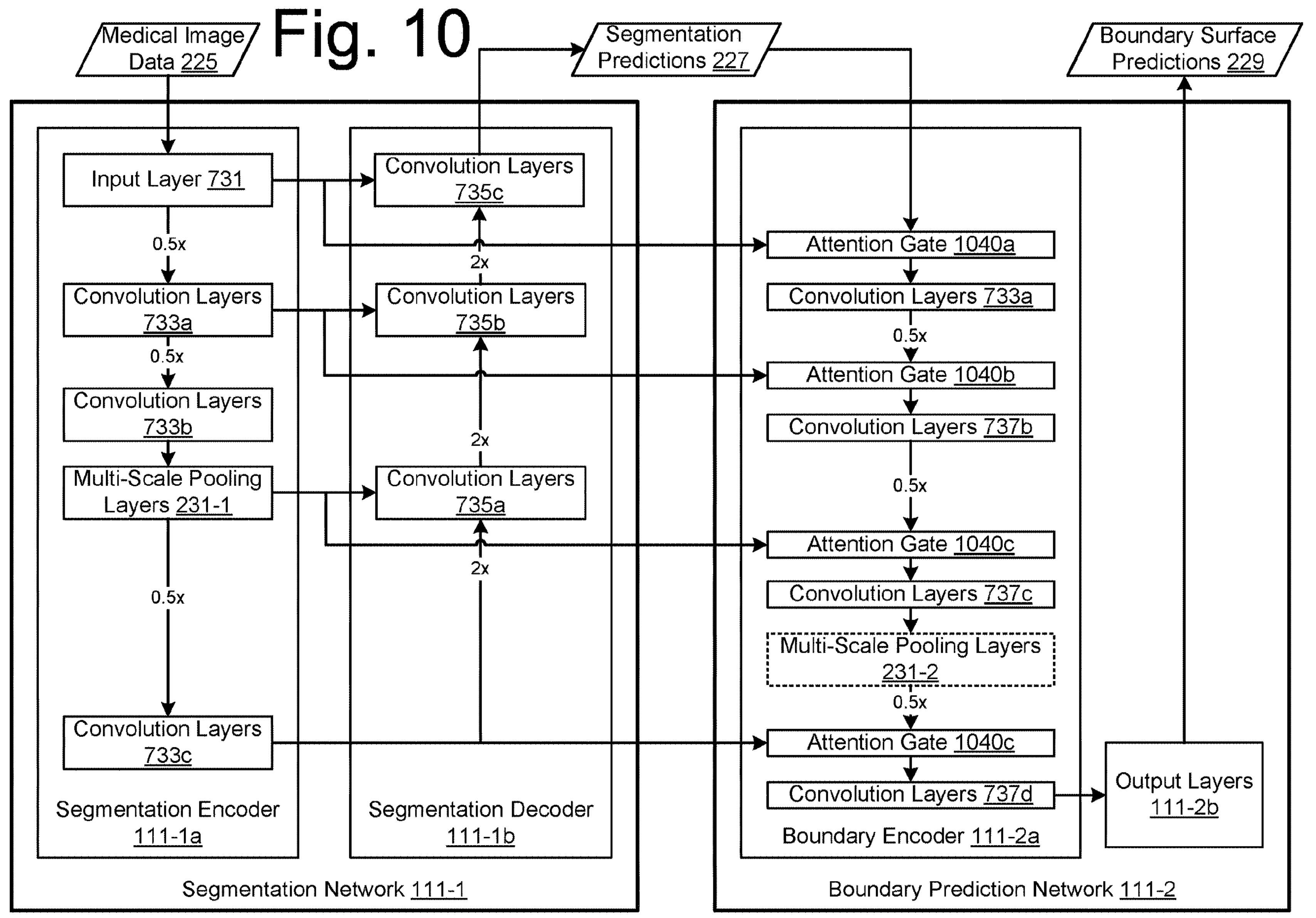
Fig. 10
Medical Image Data 225
Segmentation Predictions 227
Boundary Surface Predictions 229
Input Layer 731
0.5x
Convolution Layers 733a
0.5x
Convolution Layers 733b
Multi-Scale Pooling Layers 231-1
0.5x
Convolution Layers 733c
Segmentation Encoder 111-1a
Convolution Layers 735c
2x
Convolution Layers 735b
2x
Convolution Layers 735a
2x
Segmentation Decoder 111-1b
Segmentation Network 111-1
Attention Gate 1040a
Convolution Layers 733a
0.5x
Attention Gate 1040b
Convolution Layers 737b
0.5x
Attention Gate 1040c
Convolution Layers 737c
Multi-Scale Pooling Layers 231-2
0.5x
Attention Gate 1040c
Convolution Layers 737d
Boundary Encoder 111-2a
Output Layers 111-2b
Boundary Prediction Network 111-2

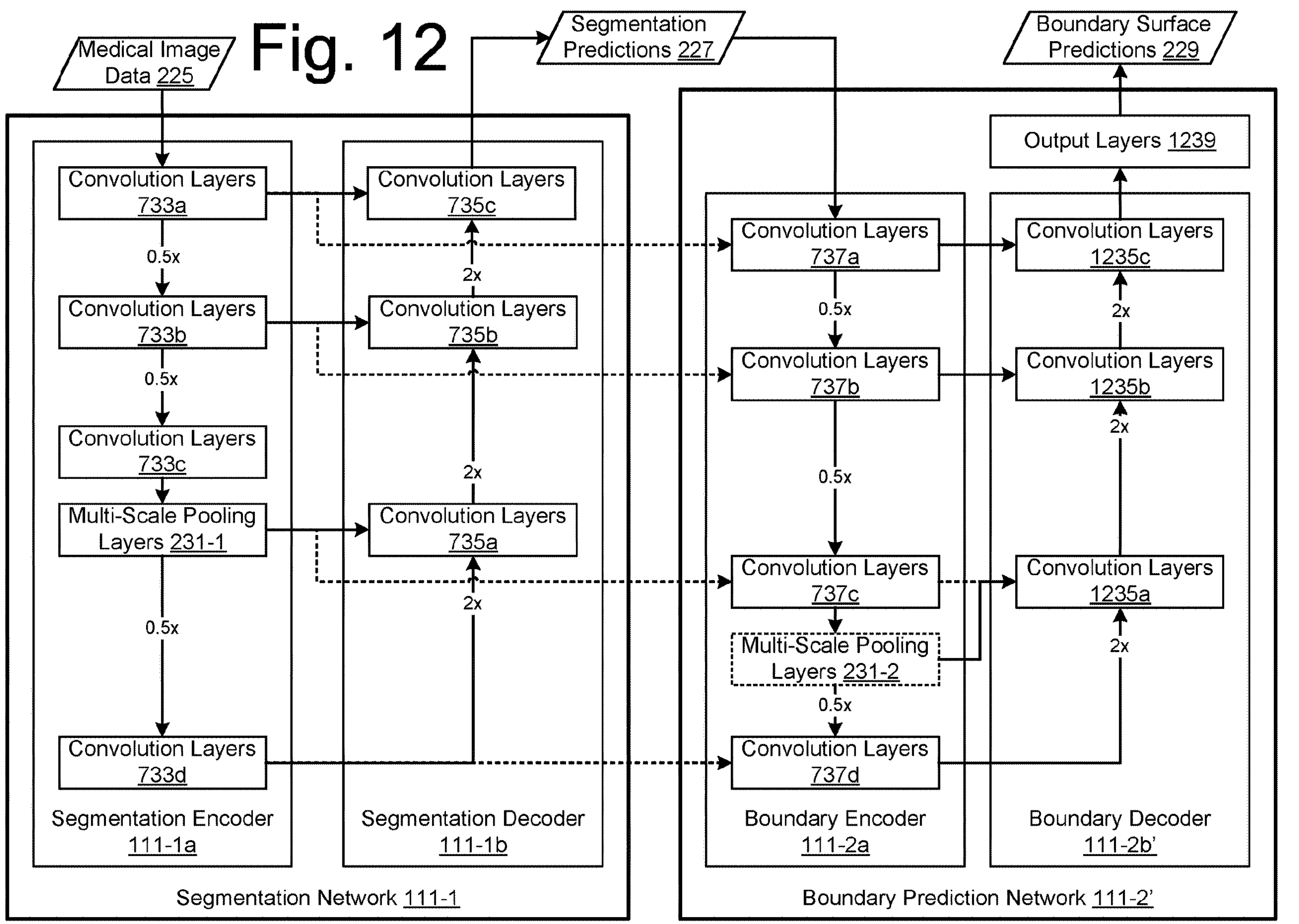

Fig. 12
Medical Image Data 225
Segmentation Predictions 227
Boundary Surface Predictions 229
Convolution Layers 733a
0.5x
Convolution Layers 733b
0.5x
Convolution Layers 733c
Multi-Scale Pooling Layers 231-1
0.5x
Convolution Layers 733d
Segmentation Encoder 111-1a
Convolution Layers 735c
2x
Convolution Layers 735b
2x
Convolution Layers 735a
2x
Segmentation Decoder 111-1b
Segmentation Network 111-1
Convolution Layers 737a
0.5x
Convolution Layers 737b
0.5x
Convolution Layers 737c
Multi-Scale Pooling Layers 231-2
0.5x
Convolution Layers 737d
Boundary Encoder 111-2a
Output Layers 1239
Convolution Layers 1235c
2x
Convolution Layers 1235b
2x
Convolution Layers 1235a
2x
Boundary Decoder 111-2b'
Boundary Prediction Network 111-2'

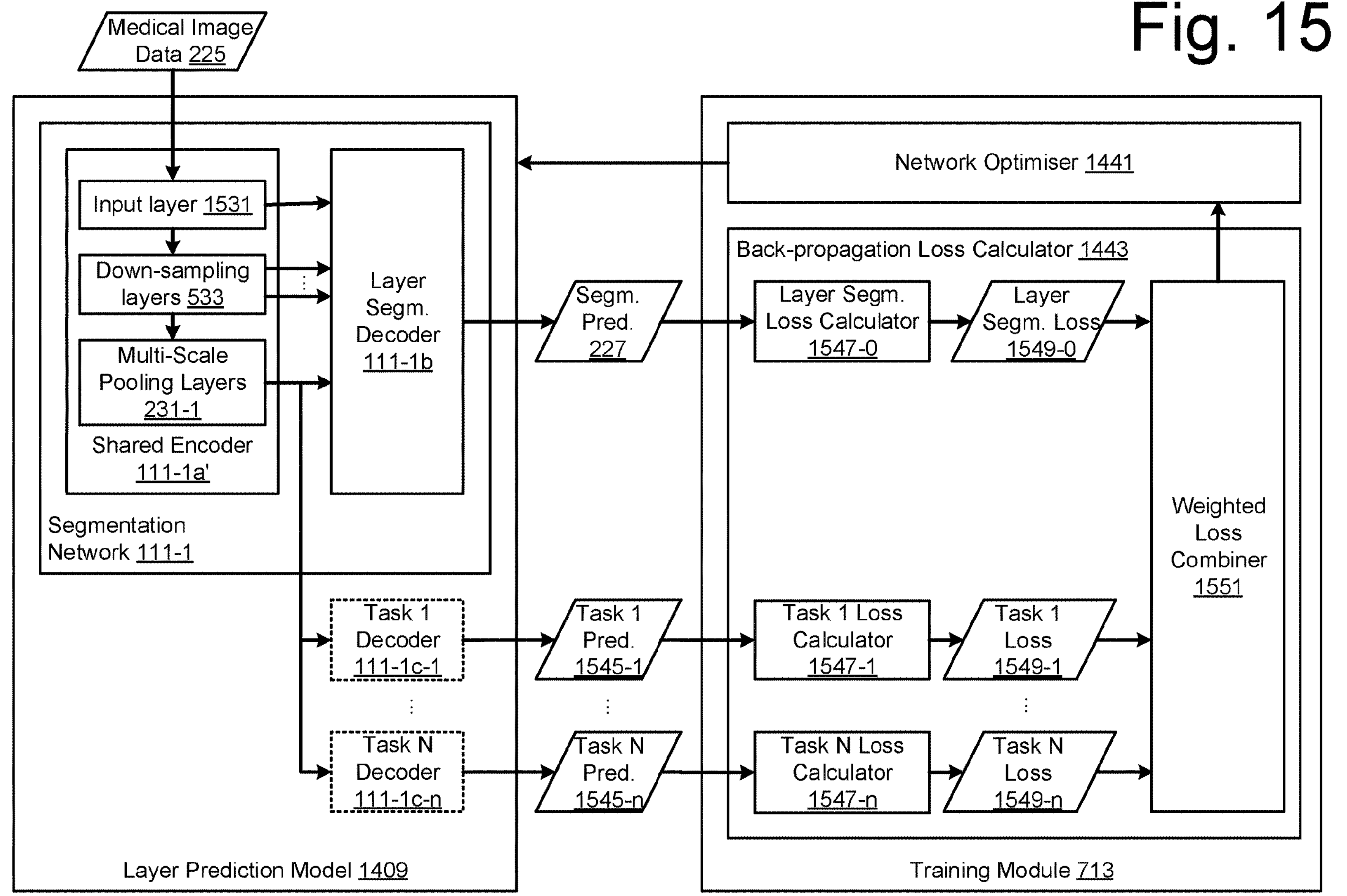
Fig. 15
Medical Image Data 225
Input layer 1531
Down-sampling layers 533
Multi-Scale Pooling Layers 231-1
Shared Encoder 111-1a'
Layer Segm. Decoder 111-1b
Segmentation Network 111-1
Task 1 Decoder 111-1c-1
Task N Decoder 111-1c-n
Layer Prediction Model 1409
Segm. Pred. 227
Task 1 Pred. 1545-1
Task N Pred. 1545-n
Network Optimiser 1441
Back-propagation Loss Calculator 1443
Layer Segm. Loss Calculator 1547-0
Layer Segm. Loss 1549-0
Task 1 Loss Calculator 1547-1
Task 1 Loss 1549-1
Task N Loss Calculator 1547-n
Task N Loss 1549-n
Weighted Loss Combiner 1551
Training Module 713

MEDICAL IMAGE ANALYSIS USING NEURAL NETWORKS

RELATED APPLICATIONS

The present application is a U.S. National Phase Application under 35 U.S.C. § 371 of International Application No. PCT/GB2022/050765 filed on Mar. 28, 2022, which claims the benefit of priority to United Kingdom Patent Application No. GB 2104506.7 filed on Mar. 30, 2021, the entire disclosures of which are expressly incorporated by reference herein.

FIELD OF THE INVENTION

This invention relates generally to data processing, and more particularly to analysing medical image data using neural networks.

BACKGROUND

Machine learning based systems and methods for medical image processing are generally known, in which models such as convolutional neural networks are trained to predict segmentation of biological features directly from input medical images. For example, Optical Coherence Tomography (OCT) is a common imaging technique used to capture micrometre-resolution 2D and 3D images of biological layers, such as retinal and macular structures, skin tissues, organ tissues, etc. Existing OCT segmentation algorithms have limitations for accurately predicting retinal layer topology and layer thickness, especially across boundary zones of degeneration, or areas with highly degenerated pathology where layers disappear. Known neural network based medical image segmentation techniques, such as RelayNet and Unet++, suffer from difficulties identifying or analysing retinal layers with no measured thickness, which in turn may cause issues of erroneous boundary prediction, with spurious layer thickness in areas with missing layers, and subsequent misclassifications of predicted layers. Such erroneous or inaccurate layer segmentation causes further problems with subsequent classification and clinical diagnosis, and overall lack of confidence from technical users, such as clinicians, when viewing output results.

What is desired is a better medical image segmentation process that addresses limitations of known methods and systems for biological tissue layer segmentation and significantly increases the quality of the final results.

SUMMARY OF THE INVENTION

Aspects of the present invention are set out in the accompanying claims.

According to another exemplary aspect, there is described a computer-implemented method for automatically analysing medical image data of biological layers, such as biological tissues. The method uses a trained model to predict the relative boundary surface between segmented layers in a source medical image, the trained model including first and second sub-networks connected in series, wherein the first sub-network receives and processes an input medical image to generate segmentation data identifying a plurality of layers in the input medical image; the second sub-network receives and processes the segmentation data to generate predicted relative boundary surfaces between the layers. Each predicted boundary surface may be defined by a predicted layer thickness relative to an adjacent boundary surface (e.g. in preceding order of a defined stack of layers). For example, the boundary surface of interest may be measured as the pixel distance relative to the boundary position of the preceding surface. Alternatively, each predicted boundary surface may be defined by individual boundary surface positions relative to a defined edge of the image, where the boundary surface of interest is measured in pixel distance from the defined edge. For example, the relative positions may be defined from a top edge of the image to effectively define predicted values as the y-coordinate value of the surface at each pixel column position.

At least the first sub-network is configured with a multi-scale pooling layer. The second sub-network may also be configured with a respective multi-scale pooling layer. The, or each, multi-scale pooling layer may provide additional filters at respective defined feature map sampling rates, for improved global spatial context. The first sub-network may also include a layer that adaptively calibrates channel-wise features to further improve feature representations, and residual connections to prevent vanishing gradients. The medical image may be optical coherence tomography, OCT, image data of biological layers, such as skin or eye tissue. Advantageously, predicting relative boundary surfaces in this way provides better delineation of segmented layers. In addition, when the relative boundary surface ground truth values are specified to be relative between two consecutive boundary surfaces, then the layer prediction network is effectively trained to predict the layer thickness at each column position of the medical image.

The first and second sub-networks may be convolutional neural networks. Each sub-network may comprise an encoder path having a plurality of down-sampling pooling layers followed by the additional multi-scale pooling layer. The first sub-network may comprise a decoder path that receives and processes output of the encoder path. The second sub-network may also comprise a respective decoder path. The, or each, decoder path may also include a plurality of up-sampling pooling layers. The multi-scale pooling layer may be an atrous spatial pyramid pooling layer including parallel filters with respective different scales defining a corresponding sampling rate. Each pooling layer may comprise a plurality of convolutional layers. The segmentation data may be a segmentation map that segments the received image data into a plurality of tissue layers.

The first sub-network may be trained by determining updates to parameter values of the first sub-network based on a calculated gradient of a loss function with respect to the parameters of the first sub-network, and wherein the loss function is determined based on training segmentation maps and the segmentation map generated by the first sub-network. The layer prediction neural network may be further trained by determining updates to the parameter values of the first sub-network and initialised parameter values of the second sub-network together, based on a calculated gradient of a loss function with respect to the parameters of the first and second sub-networks, and wherein the loss function is determined based on training relative boundary surface values and the predicted relative boundary surface values generated by the second sub-network.

Training the neural network may further comprise providing a third sub-network connected to the first sub-network, to output data identifying one or more additional features of the input medical image data such as disease type, wherein the first, second and/or third sub-networks are trained using back-propagation of a weighted combined loss calculated from the outputs of the third sub-network. Training the neural network may further comprise providing a fourth sub-network connected to the third sub-network, to output additional data identifying confounding features of the input medical image data for removal to enhance the interoperability of the first and third network across different medical imaging sources, wherein the first sub-network is trained using back-propagation of a weighted combined loss calculated from the outputs of the third sub-network with a penalty value derived from at least the outputs of the fourth sub-network.

The predicted relative boundary surface values may be processed using a further trained classifier. The method may further comprise generating an augmented version of the input medical image including a representation of reconstructed boundaries between the plurality of tissue layers.

According to a further aspect, there is described a medical image processing method to generate a layer boundary map from an input medical image using a trained neural network, by generating predicted layer segmentation data from the input medical image using a first sub-network of the trained neural network, and calculating corresponding relative boundary surfaces between the segmented layers from the predicted layer segmentation data using a second sub-network of the trained neural network, wherein the first and second sub-networks are configured with respective multi-scale pooling layers to encode global semantic information from the input medical image.

According to yet another aspect, there is described a method for processing medical image data, comprising one or more processors configured to calculate, using a first trained model, estimated segmentation data from input medical image data of biological tissue, wherein the segmentation data identifies a plurality of layers of biological tissue; and generate, using a second trained model, predicted relative boundary surfaces between the identified layers from the estimated segmentation data; wherein the first and second trained models are each configured with a multi-scale pooling layer.

According to another aspect, there is described a neural network based prediction method using a plurality of task-specific decoder networks and a shared encoder network. The method comprises receiving image data of tissue layers captured by a medical imaging device, and providing the image data as input to a multi-task prediction neural network to obtain a segmentation map that segments the received image data into a plurality of tissue layers. The multi-task prediction neural network includes encoder and decoder sub-networks of a segmentation neural network configured to receive and process the input image data to generate the segmentation map; and one or more additional task-specific decoder sub-networks configured to receive and process output from the encoder sub-network to generate task-specific prediction data that identifies a respective aspect of the captured image data. The multi-task prediction neural network is trained using the outputs of the one or more additional task-specific decoder sub-networks.

The encoder sub-network may comprise a plurality of down-sampling pooling layers followed by the additional multi-scale pooling layer. The additional multi-scale pooling layer may be an atrous spatial pyramid pooling layer including parallel filters with respective different scales. Each decoder sub-network may comprise a plurality of up-sampling pooling layers. Each additional task-specific decoder sub-networks may have a different architecture to the segmentation decoder sub-network.

The multi-task prediction neural network may be further trained by determining updates to parameter values of the multi-task prediction neural network based on a calculated gradient of a loss function with respect to the parameters of the encoder sub-network and the plurality of decoder sub-networks of the multi-task prediction neural network, and wherein the loss function is determined from the losses of all tasks combined as a weighted average.

The multi-task prediction neural network may be further trained by calculating a gradient of a respective task-specific loss function with respect to the parameters of each one of the decoder sub-networks of the multi-task prediction neural network, and wherein each task-specific loss function is determined based on respective task-specific training data and the task-specific prediction data generated by the respective decoder sub-network. The gradient of the combined weight loss may be back-propagated through the decoders and the shared encoder. Updates to parameter values of the multi-task prediction neural network may be further determined based on back-propagation of a weighted combination of the calculated gradients of respective task-specific loss functions through the decoders and shared encoder.

The task-specific decoders may be configured to generate probability map data identifying one or more of predicted segmentation of abnormalities in the captured image data, predicted classification of a disease in tissue in the captured image data, predicted classification of normal tissue in the captured image data, and predicted object boundaries in the captured image data.

An adversarial neural network may be further provided to receive and process the outputs from the decoder sub-networks to generate additional prediction data identifying confounding features in the captured image data, such as non-pathological and/or non-physiological features that the trained network should not learn as features of interest. The adversarial neural network may be trained based on back-propagation of calculated outputs of a corresponding adversarial loss function. Updates to parameter values of the multi-task prediction neural network may be further determined based on back-propagation of a weighted combination of the calculated gradients of respective task-specific loss functions after applying a calculated adversarial penalty with respect to the parameters of the multitask network and the adversarial neural network connected in series.

A boundary prediction neural network may be further provided to receive and process the segmentation map from the multi-task prediction neural network to generate predicted relative boundary surfaces between the tissue layers, wherein the relative boundary prediction neural network is configured with a multi-scale pooling layer to provide additional filters at respective defined sampling rates. The multi-task prediction neural network may be pre-trained independent of the boundary prediction neural network on training images with associated layer segmentation training data, and wherein the pre-trained segmentation neural network and the initialised boundary prediction neural network are subsequently trained together on training images with associated relative layer boundary training data.

According to yet a further aspect, there is described a method of training a neural network for segmentation prediction, the method comprising:

providing a multi-task prediction network that is trained to output data identifying one or more predicted pathological features of input medical image data; and providing an adversarial network that that is trained to output data identifying one or more confounding features of the input medical image data;

wherein the multi-task prediction network is trained using back-propagation of a weighted combined loss calculated from the outputs if the multi-task prediction network with a penalty value derived from the outputs of the adversarial network.

Training of the segmentation prediction network may include iterating through the following steps until optimised:

(i) train the multi-task prediction network;

(ii) train the adversarial network, using the frozen weights of the trained multi-task prediction network as input to the adversarial network; and (iii) freeze the weights of the adversarial network and re-train the multi-task prediction network with a new multitask loss function, using the frozen weights of the trained adversarial network to provide an adversarial loss value as an additional penalty in the new multitask loss function.

Components of the multi-task prediction network and the adversarial network may be disconnected from the neural network for segmentation prediction after training.

In other aspects, there are described apparatus and systems configured to perform any one of the methods as described above. In a further aspect, there is provided a computer program comprising machine readable instructions arranged to cause a programmable device to carry out any one of the methods as described above.

BRIEF DESCRIPTION OF THE DRAWINGS

There now follows, by way of example only, a detailed description of embodiments of the present invention, with references to the figures identified below.

FIG. 4, which comprises

FIG. 5, which comprises

FIG. 7 is a schematic block flow diagram illustrating the network architecture of the layer prediction model according to an exemplary implementation of the first embodiment.

FIG. 8, which comprises

FIG. 10 is a schematic block flow diagram illustrating the network architecture of the layer prediction model according to an exemplary alternative implementation of the first embodiment.

FIG. 12 is a schematic block flow diagram illustrating the network architecture of the layer prediction model according to another exemplary alternative implementation of the first embodiment.

FIG. 15 is a block flow diagram schematically illustrating the architecture and data flows of the segmentation network and training module, according to improved training aspects of the second embodiment.

FIG. 16, which comprises

DESCRIPTION OF EMBODIMENTS

First Embodiment

Figure 1:
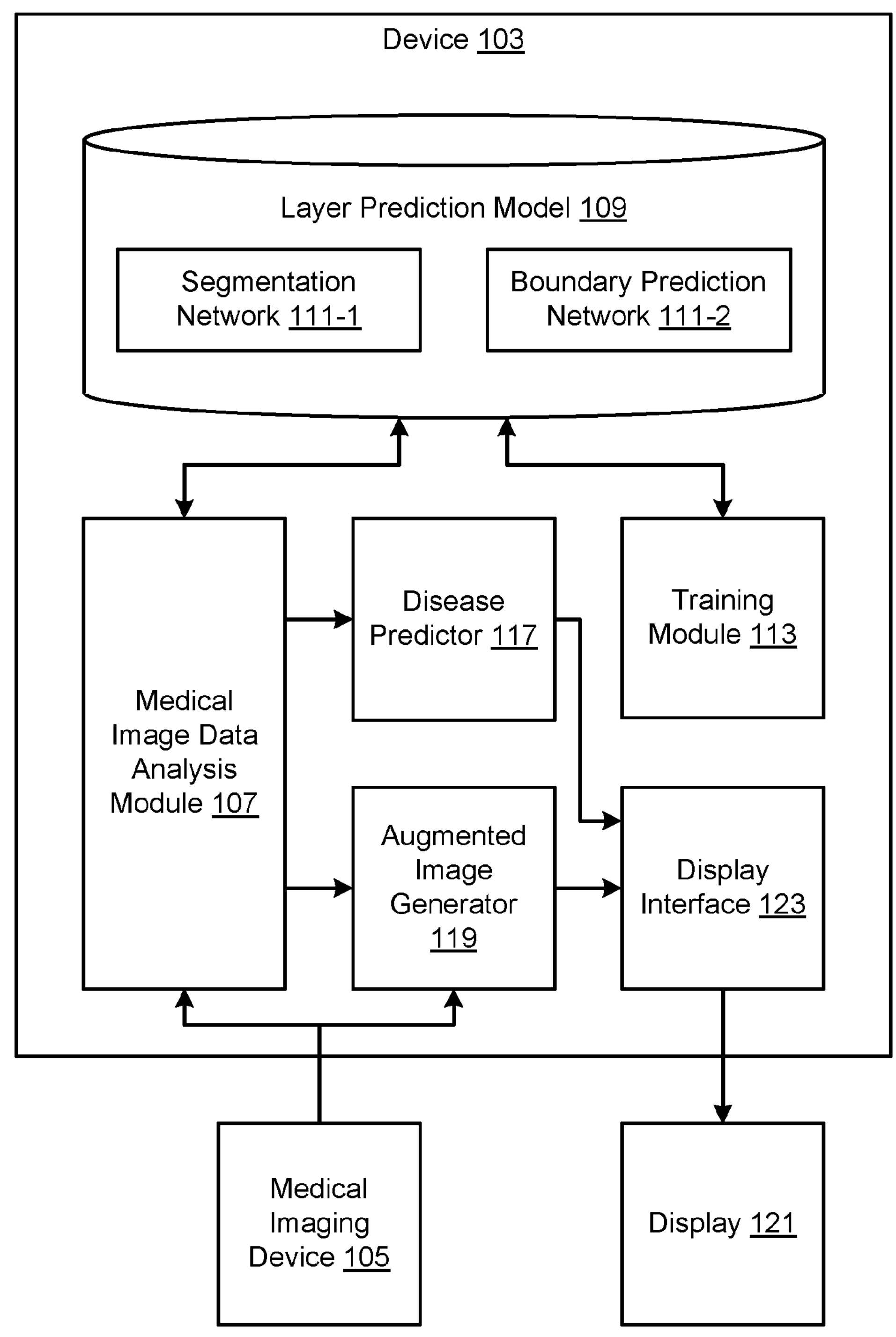
FIG. 1 is a block flow diagram schematically illustrating the main components of a medical image processing system according to a first embodiment of the invention.

FIG. 1 is a block diagram schematically illustrating an example medical image processing system 101 configured to automatically analyse medical image data by a device 103 in accordance with exemplary embodiments of the present disclosure. The system 101 may be configured in various implementation contexts. For example, the device 103 may include a computer configured to determine layer structure from medical image data received or acquired from a medical imaging device 105, using a medical image data analysis module 107. Alternatively, processing modules of the device 103 may be embedded into, or integrated with, the medical imaging device 105. The medical imaging device 105 may provide medical image data of any modality depending on the implementation context. For example, the medical imaging device 105 may be an optical coherence tomography (OCT) scanner to provide micrometer-resolution, two- and three-dimensional images from within optical scattering media (e.g., biological tissue). In other exemplary implementation contexts, the medical imaging device 105 may alternatively or additionally include a magnetic resonance imaging (MRI) scanner, a computed tomography (CT) scanner, an ultrasound (US) scanner, an X-ray scanner, an image scanner, or the like, to provide medical image data including visible layers of biological features.

Figures 2, 3:
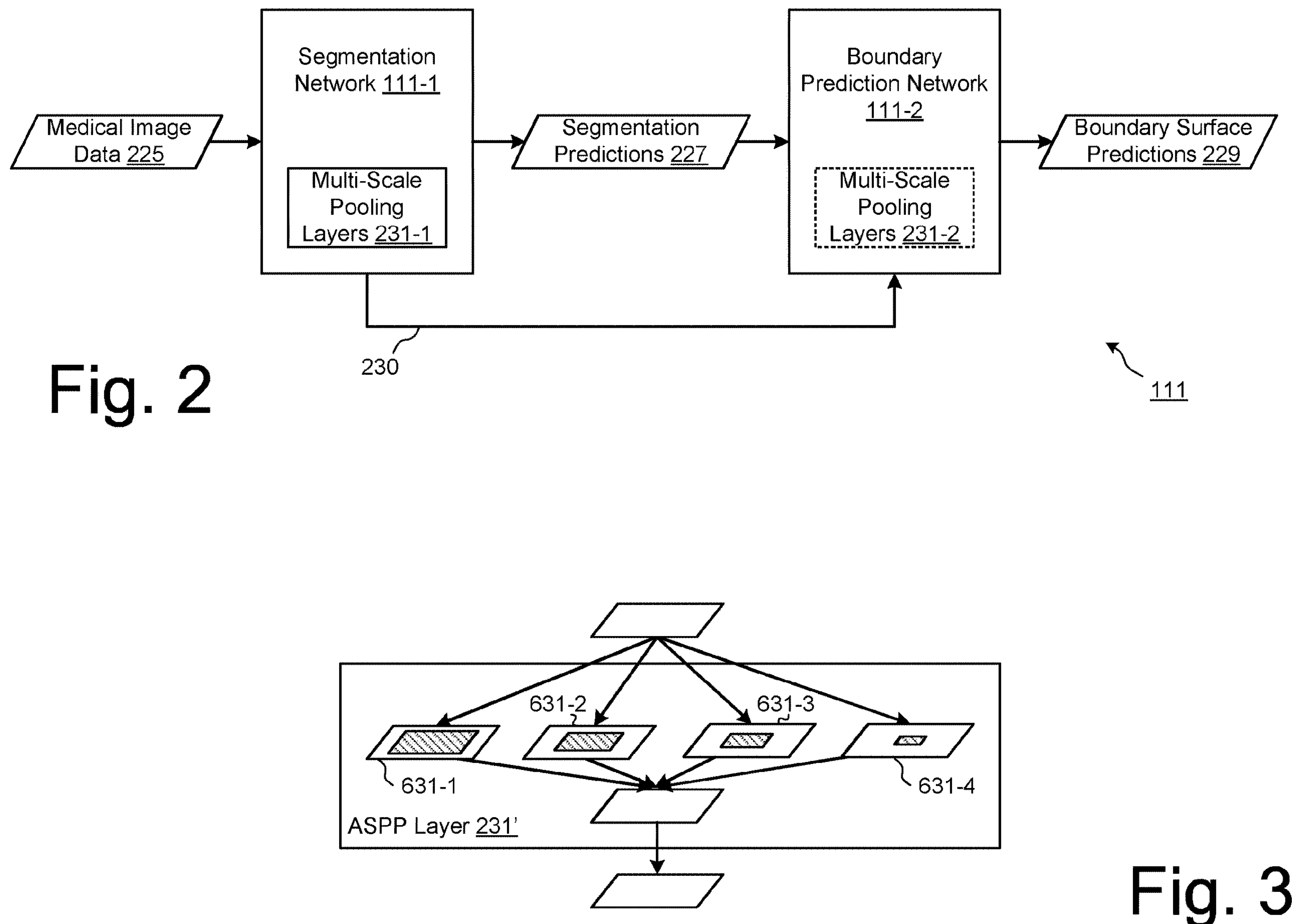
FIG. 2 is a block flow diagram schematically illustrating the main elements of the layer prediction model shown in FIG. 1.
FIG. 3 shows an exemplary implementation of the multi-scale pooling layers shown in FIG. 2.

In the present embodiments, the medical image data analysis module 107 uses a layer prediction model 109 that is trained to predict layer segmentation and boundary surfaces directly from the received medical image data. Typically, the segmented layers correspond at least to the visible layers of biological features, such as tissue layers, in the source medical image. The segmented layers may also include non-biological features, such as imaging artefacts or non-tissue entities, as well as hidden (non-visible) biological layers. The layer prediction model 109 may be defined as a structured arrangement of processing nodes, each node having one or more corresponding weight parameters. FIG. 2 schematically illustrates the main elements of the layer prediction model 109 according to the exemplary embodiments. The layer prediction model 109 in the present exemplary embodiments is a convolutional neural network (CNN), including the segmentation network 111-1 and the boundary prediction network 11-2 as a pair of sub-networks 111 connected in series. Skip connections may be provided linking the two sub-networks 111-1,111-2, for example to preserve features at different levels of abstractions while enabling direct propagation of gradients from deep layers to shallow layers. It is appreciated that each sub-network 111 may be implemented as a separate CNN with an output layer of the first sub-network 111-1 coupled to an input layer of the second network 111-2.

The segmentation network 111-1 is used to process input medical image data 225 and to output data identifying corresponding segmentation predictions 227, along with intermediate outputs from hidden layers, to the boundary prediction network 111-2. The segmentation predictions 227 may include data values defining a layer segmentation probability map, identifying the predicted probabilities of presence or absence of each one of a predefined set of layers, at each column location (or pixel-wide vertical cut) of the image data input to the network 111-1. The boundary prediction network 111-2 is then used to process the input segmentation predictions 227, while concurrently refining the learned features using the intermediate outputs from hidden layers in the first network 111-1, to determine corresponding relative boundary surface predictions 229 for each one of defined set of layers in the input medical image 225. The boundary surface predictions 229 may include data values defining predicted thicknesses of each one of a predefined set of biological layers, at each pixel-wide vertical cut through the image data input to the network 111-2. It is appreciated that the segmentation prediction values and the relative boundary surface prediction values at each pixel-wide vertical cut may correspond to predicted segmentation and thicknesses of layers across each slice or slab (e.g. a pixel-wide vertical cut) through a three-dimensional source image. For example, each predicted boundary surface may be defined by a predicted layer thickness relative to a preceding boundary surface, where the boundary surface of interest is measured as the pixel distance relative to the boundary position of the preceding surface. Alternatively, each predicted boundary surface may be defined by individual boundary surface positions relative to a defined edge of the image, where the boundary surface of interest is measured in pixel distance from the defined edge, such as a top edge to effectively define predicted values as the y-coordinate value of the surface at each pixel column position.

The inventors have realised that known segmentation networks, in particular networks implementing conventional U-Net architectures as described in the paper "U-Net: Convolutional Networks for Biomedical Image Segmentation" by Ronneberger et al., typically use local spatial information obtained through a view constrained by the convolutional kernel size to classify each pixel. This can result in potential non-biological (and/or non-physiological) layer patterns manifesting as spurious mis-predictions of patches of layer tissue in places that are not anatomically possible. Accordingly, in addition to implementing a paired sequence of sub-networks, prediction of segmented layers and associated boundary predictions by the analysis module 107 is further quantifiably improved by incorporating knowledge of the surrounding area or context into the network. As shown in FIG. 2, this is achieved by implementing an additional block of multi-scale pooling layers 231-1 within the first sub-network 111-1, to reduce occurrence of mis-predictions of patches of layer tissue in places that are not anatomically possible and improve overall segmentation performance and accuracy. Optionally, additional multi-scale pooling layers 231-2 may be included in the second sub-network 111-2 to further improve performance and accuracy of relative boundary surface prediction, for example by enabling the second sub-network 111-2 to learn multi-scale contextual features to improve learning efficiency and performance in predicting the relative boundary surfaces between layers.

As schematically illustrated in the example of FIG. 3, the multi-scale pooling layers may be implemented as an atrous spatial pyramid pooling (ASPP) layer 231', derived for example from the paper "Rethinking Atrous Convolution for Semantic Image Segmentation" by Chen et al. For example, an ASPP layer 231' may be implemented within an encoder/contracting path of a respective sub-network 111 of the trained layer prediction model 109. The ASPP layer 231' may be configured to receive the output from a lower resolution layer in the encoder/contracting path. The individual ASPP layers 631-1 to 631-4 within the block define one of a plurality of parallel filters with respective different scales, each providing a respective sampling rate of the input feature layer/map and an additional image pooling for image-level features. In the illustrated example, the ASPP layer 231' provide four additional filters at respective different scales and sampling rates, but it is appreciated that a different number of additional filters may be implemented. The additional filters at multiple sampling rates allow the trained segmentation and boundary prediction sub-networks 111 to probe the original image with multiple filters that have complementary effective fields of view, thus enabling better predicting segmentation of the biological layers, e.g. retinal tissue layers, as well as layer context at multiple scales so that the detailed structures of the biological layers can be retained, as well as prediction of missing and/or hidden layers.

The paired configuration of sub-networks 111 advantageously enables the trained layer prediction model 109 to deal with biological layers with zero thickness, which is not uncommon in retinal imaging situations, where layer boundaries may appear and disappear for example due to layers going in and out of focus, or being absent through cell degeneration. In addition, the network configuration, and in particular the second sub-network 111-2, helps to completely eliminate mis-predictions that are anatomically impossible such as spurious tissue patches wrongly predicted within another tissue layer. Furthermore, the additional multi-scale pooling layers 231 within the encoder path of a sub-network 111 advantageously yields long range spatial information from the surrounding environment that is used to quantifiably improve segmentation and layer boundary prediction accuracy, and specifically reduce the occurrences of mis-predicted patches of pixels that are anatomically-impossible. This further advantageously results in overall more accurate image segmented layer determination and robustness against image deformations.

Referring back to FIG. 1, the structure and weights defining each sub-model 111 of the trained layer prediction model 109 may be initiated and updated by a training module 113 during a training stage. For example, the training module 113 may perform training of the model on input training data including medical images with associated graded layer segmentation labels and relative boundary surface values, by learning optimal network weights to minimise one or more defined loss functions based on the training data. Each training image may be graded by trained experts to define the associated segmentation labels, with relative boundary surface 'ground truth' values derived from segmentation masks based on the graded training images. For example, the boundary surface values may be layer thickness values defined relative to a preceding boundary surface, measured as the pixel distance relative to the boundary position of the preceding surface. Alternatively, the boundary surface values may be individual boundary surface positions defined relative to a defined edge of the image, measured in pixel distance from the defined edge. The training module 113 may be configured to re-train the layer prediction model 109 based on additional instances of acquired medical image data.

The segmentation predictions and boundary surface predictions data output by the analysis module 107 may be stored in a memory. The system 101 may be further configured to provide the layer segmentation prediction data and/or predicted boundary surfaces to one or more processes or modules for further data processing. For example, the device 103 may be configured with a disease predictor module 117 to process the outputs from the analysis module 107 and further predict the presence of, and/or onset of, respective one or more disease-related indicators captured in the source image. The nature and configuration of the disease predictor module 117 will be specific to the implementation context of the system 101, and may include respective trained neural networks.

The device 103 may include an augmented image generator 119 to generate augmented versions of source medical images, for example with visual representations of the visible (and hidden) layers identified by the analysis module 107. The augmented version may include representations of reconstructed boundaries between the layers, based on predicted segmentation and predicted boundaries. The augmented image and/or indications of the predicted disease(s) may be output to a display 121. The display 121 may form part of the device 103 or may be connected to the device 103, for example via a display interface 123. The output visualization advantageously enables a technical user of the system 101, such as a clinician, to recognize a clinical basis for a classification output generated by the disease predictor 117 for the input medical image.

Figure 4A:
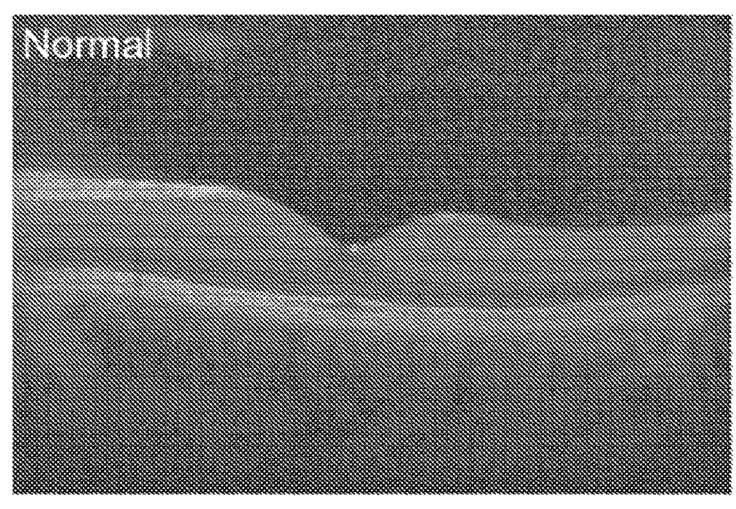
FIGS. 4A to 4C, are examples of medical images of a healthy patient's eye as acquired by an OCT scanner, and corresponding augmented version based on the predicted layer boundaries.
Figure 4B:
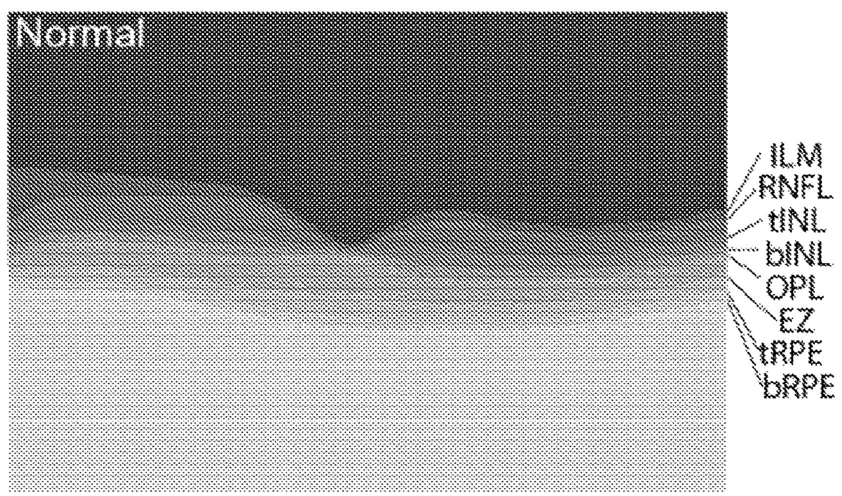
Figure 4C:
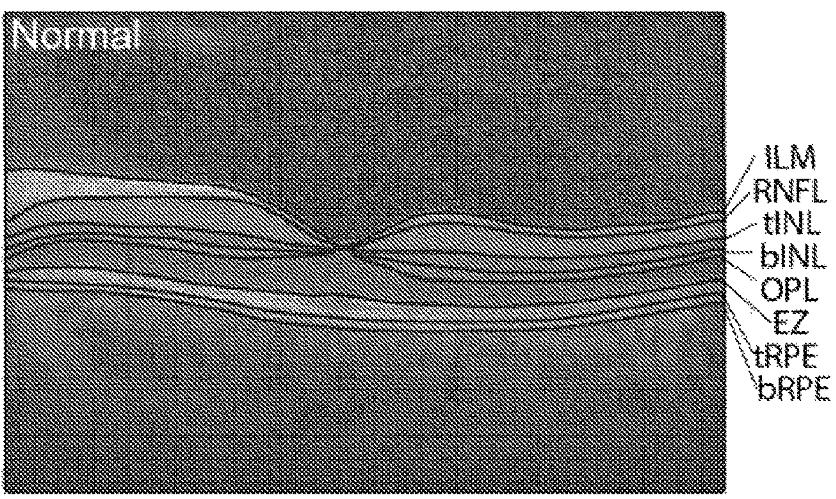

FIG. 4A shows an example of a medical image from a scan of a normal, healthy retina. More specifically, the example is a cross-sectional slice of a volumetric image of a patient's eye as acquired by an OCT scanner 5. The thickness of each layer varies along the width of the scan but clear separation between each adjacent is visible in the case of a normal retina. FIG. 4B is an example of a corresponding segmentation map, for example based on output from the segmentation network 111-1 of the trained layer prediction model 109 when used to process the input image of FIG. 4A. The exemplary stack of segmented retinal layers as labelled in FIG. 4B include: Internal Limiting Membrane (ILM), Retinal Nerve Fiber Layer (RNFL), Inner Nuclear Layer (inner boundary, tINL), Inner Nuclear Layer (outer boundary, bINL), Outer Plexiform Layer (OPL), Inner Segment Ellipsoid Region (EZ), Inner boundary of the Retinal Pigmented Epithelium (Inner RPE, tRPE), and Bruchs Membrane or Outer RPE boundary (Bruchs Membrane, bRPE). FIG. 4C is an example of a corresponding augmented version of the input image, for example as output by the augmented image generator 119. As shown, the example augmented version includes representations of the visible predicted layers over the input medical image. The representations may include lines denoting the boundaries between adjacent predicted layers. The augmented image generator 119 may generate the representations based on output generated by the medical image data analysis module 107 using the trained layer prediction model 109. As will be described in greater detail below, the medical image data analysis module 107 of the present embodiments effectively learns to count the number of pixels belonging to a certain layer, along each vertical cut of the input medical image shown in FIG. 4A. The augmented image generator 119 may be configured to generate the boundary representations as shown in FIG. 4C from the layer boundary prediction data 229 output by the trained layer prediction model 109.

Figure 5A:
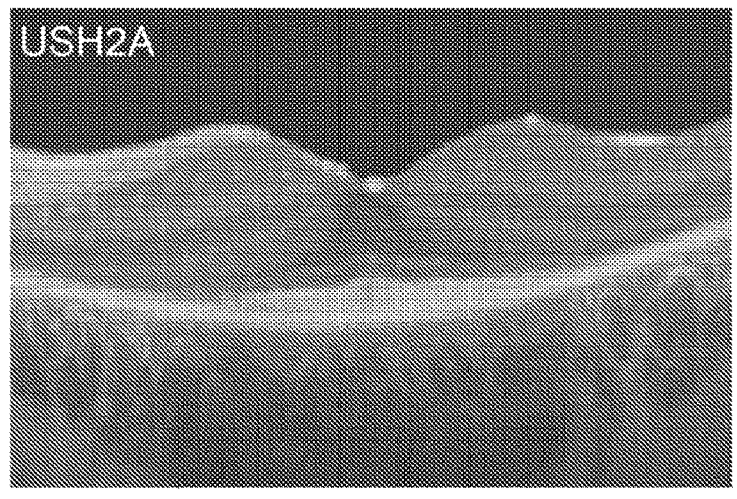
FIGS. 5A to 5C, are examples of OCT images of a patient's eye showing signs of a detectable condition, and corresponding augmented version based on the predicted layer boundaries.
Figure 5B:
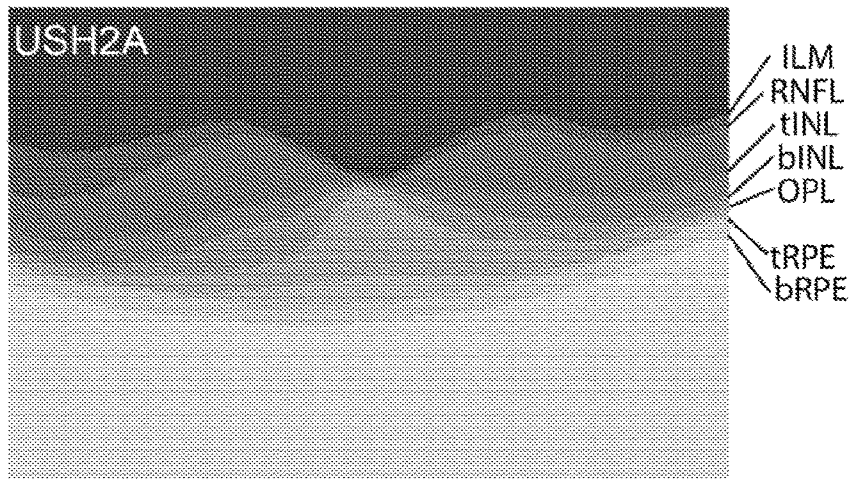
Figure 5C:
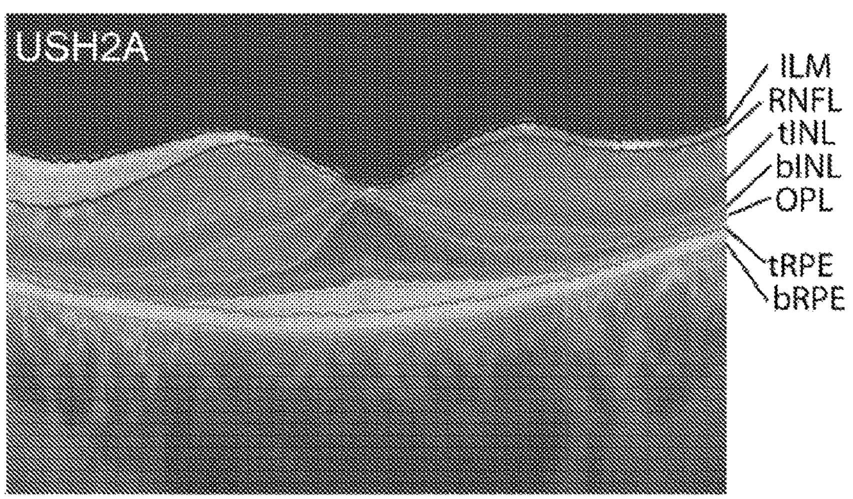

FIG. 5A shows an example of an OCT scan of a retina exhibiting presence of Ushers Syndrome, where particular retinal layers are lost with eccentricity compared to the full set of defined layers of a normal retina (e.g. as compared to the example shown in FIG. 4C). FIG. 5B schematically illustrates an example rendering of segmented layers determined by the trained layer prediction model 109 from the input image shown in FIG. 5A. As illustrated by the exemplary augmented version of corresponding FIG. 5C, the layer prediction model 109 of the present embodiments is trained to learn and identify both visible and hidden (non-visible) layers in the captured source image, whereby an accurate prediction of the classification of each visible layer and boundary surfaces between respective pairs of adjacent layers is obtained.

In this particular exemplary implementation context, the trained layer prediction model 109 advantageously enables the system 101 to perform automatic and accurate analysis of OCT retinal data, to output high-resolution maps of retinal structure substantially in real-time (e.g. no perceived processing delay between image capture and output results). Further, improved accuracy in the pre-processing of OCT volume data enables more accurate predictions of retinal structure, which can provide measures to quantify therapeutic impact and accurate predictions of degeneration progression, and in turn provide useful information to inform on the therapeutic window and enable better interpretation of clinical trial findings. For example, the inventors have realised that the improved segmentation and boundary surface prediction data output by the analysis module 107 of the present embodiments advantageously overcome known limitations observed from comparable outputs of prior segmentation techniques, for example when fed into disease predictors 117 configured to predict progression based on disease heterogeneity in rare Inherited Retinal Disease (IRD) implementation contexts, such as Choroidemia and USH2-associated retinopathy, as well as other common indications such as Age-related Macular Degeneration (AMD) and Diabetic Retinopathy (DRE).

As those skilled in the art will appreciate, the improved layer segmentation and boundary surface prediction techniques of the present embodiments may be applied to additional types of medical imaging other than OCT. For example, aspects of the embodiments can be applied to any medical imaging task based on identifying stacked layers in the source medical image data. The sub-networks 111 of the model 109 can be trained directly on different types of medical image depending on the specific implementation context, where the input medical images include stacked layers that change their orientation across space and where these changes can be predicted by local information. Furthermore, the ordering of stacked layers captured in the medical images may represent biological (as well as physiological) constants that are implemented by the trained networks 111.

As one specific alternative example, the present embodiments are applicable to ultrasound medical images of skin or tissue, e.g. for image data analysis for skin cancer detection, exploration and/or surgical planning for ultrasound. The improved network architectures of the trained models in the present embodiments may be used to enable effective and accurate machine learning of crafted priors to reconstitute boundaries to make a clinically useful segmentation. More particularly, the trained layer prediction models of the present embodiments are configured to better handle stratified healthy tissue with disruption, and loss/addition of layers with pathology, thereby providing broader predicted feature sets and ultimately better classification.

As another alternative example implementation context, the present embodiments are applicable to the growing field of endoscopic optical imaging (which may be OCT and light field based), e.g. by providing more accurate image reconstruction and disease identification. Typically, medical imaging in this implementation context is used in neonatal and adult care to assess for pathology in the oesophagus and colon. Both of these tissues have 3D laminar structures complicated by pathological change, which the trained models in the present embodiments can accurately segment, classify and derive layer boundary surfaces.

As those skilled in the art will appreciate, the medical image data analysis module 107, training module 113, and disease predictor module(s) 117 may be combined into a single module or divided into additional sub-modules. For example, the medical image data analysis module 107 may include additional components, such as a memory to store trained parameter data of the sub-networks 111 of the layer prediction model 109. The system 101 may also include other software and/or hardware components, sub-components, modules, and devices commonly found in a computing system/device, which are not illustrated in FIG. 1 for clarity of the description.

Figure 6:
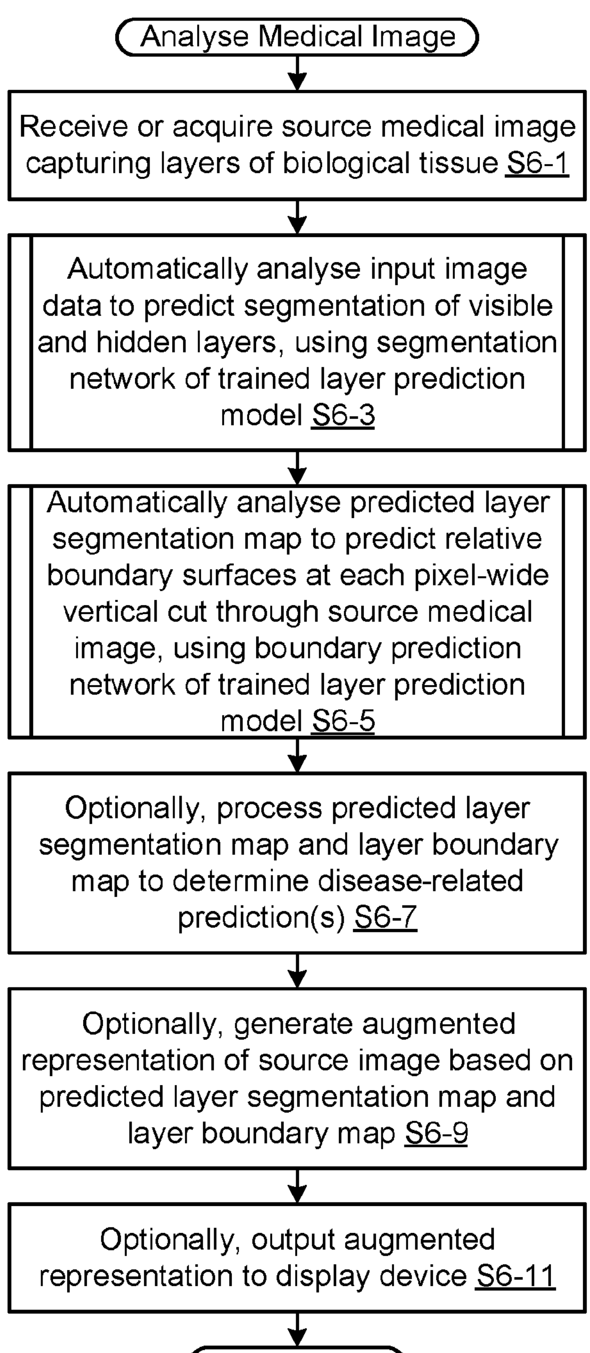
FIG. 6 is a flow diagram of an exemplary process of predicting biological tissue layer segmentation and boundary surfaces from medical image data using the trained layer prediction model, according to the first embodiment.

An overview description has been given above of the components forming part of the medical image processing system 101 of an embodiment. A more detailed description of the operation of these components will now be given with reference to the flow diagram of FIG. 6, showing an exemplary process of predicting retinal layer segmentation and boundary surfaces from medical image data using the trained layer prediction model 109, according to another embodiment. While the various steps in this flowchart are presented and described sequentially, it should be appreciated that some or all of the steps may be executed in different orders, may be combined or omitted, and some or all of the steps may be executed in parallel. Further, in one or more of the example embodiments, one or more of the steps described below may be omitted, repeated, and/or performed in a different order.

As shown in FIG. 6, at step S6-1, medical image data 225 is received or acquired by the analysis module 107, for example from the medical imaging device 105. The source medical image captures at least a region of the body of a patient, and in particular a stack of visible (and non-visible) biological layers in the region. The medical image may be a two-dimensional (2D) image (e.g., represented as a 2D array of pixels), a three dimensional (3D) image (e.g., represented as an array of 2D image planes or slices through a capture volume, or a 3D array of voxels), or a higher dimensional image (e.g., incorporating additional information or metadata such as time, wavelengths, etc.). In one particular exemplary implementation context, the source medical image is OCT image data capturing retinal layers of a patient's eye, for example acquired by an OCT scanner 105 that captures intensity values at each voxel indicative of the reflection and absorption of light waves at a corresponding location in the eye tissue. The OCT image data may be a series of 2D cross-sectional slices (B-Scans) that can be combined to build up a volumetric image of the eye, or a 3D dataset composed of an array of B-scans.

At steps S6-3 and S6-5, using a single forward pass through the trained layer prediction model 109, source image data is passed through the trained sub-networks 111 of the layer prediction model 109 to automatically analyse and determine the segmentation (as well as any hidden) layers and corresponding layer boundary surfaces therebetween in the source medical image. These processing steps will be described in further detail with reference to FIG. 7, schematically illustrating the network architecture of the layer prediction model 109 according to an exemplary implementation. Reference is also made to FIGS. 8 and 9, schematically illustrating example implementations of the blocks of convolution layers shown in FIG. 7. Corresponding reference numerals to those of preceding figures are used where appropriate for corresponding elements.

As shown in FIG. 7, the network architecture of the layer prediction model 109 according to one embodiment includes three paths or towers:

(1) a first encoder path 111-1*a* (which may also be referred to as a first down-sampling tower or contracting path) in the segmentation network 111-1, enhanced with a block of multi-scale pooling layers 231-1, such as an ASPP layer 231', to capture contextual or global information;

(2) a decoder path 111-1*b* (which may also be referred to as a decoding up-sampling tower or expansive path) in the segmentation network 111-1, to capture fine local features for an intermediate prediction of layer segmentation; and (3) a second encoder path 111-2*a* (which may also be referred to as a second down-sampling tower or contracting path) in the segmentation network 111-2 that can utilize complementary features at different levels of abstractions from one or more earlier layers of the model 109 to refine the learned features for the final boundary surface predictions 229.

For example, the encoder path 111-1*a* of the segmentation network 111-1 feeds input source image data 225 through a sequence of down-sampling convolution layers 733. It will be appreciated that the input medical image data 225 may be a sequence of portions of source image data received from the imaging device 105. For example, the source image may be divided into patches of defined pixel width and height dimensions. The output of the first encoder path 111-1*a* is then passed to a respective decoder path 111-1*b* of the segmentation network 111-1 that feeds the data through a sequence of up-sampling convolutional layers 735. Down-sampling may be achieved with max-pooling layers while up-sampling may be achieved with a plurality of transpose convolution layers. Those skilled in the art will appreciate that the input, hidden and output layers of the sub-networks 111 as schematically illustrated in FIG. 7 may each include K layers (not shown for clarity), corresponding to the defined pixel thickness of each input slab through a source 3D medical image.

Figure 8A:
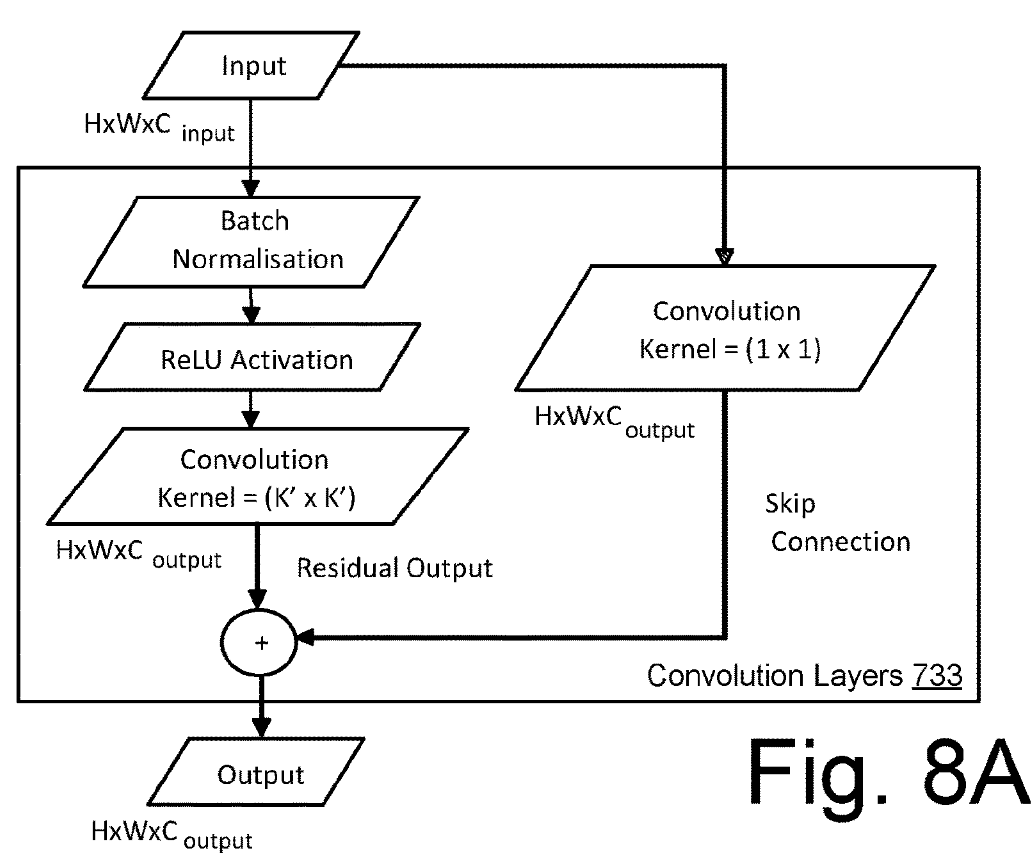
FIGS. 8A and 8B, and FIG. 9 show exemplary implementations of the blocks of convolution layers shown in FIG. 7.
Figure 9:
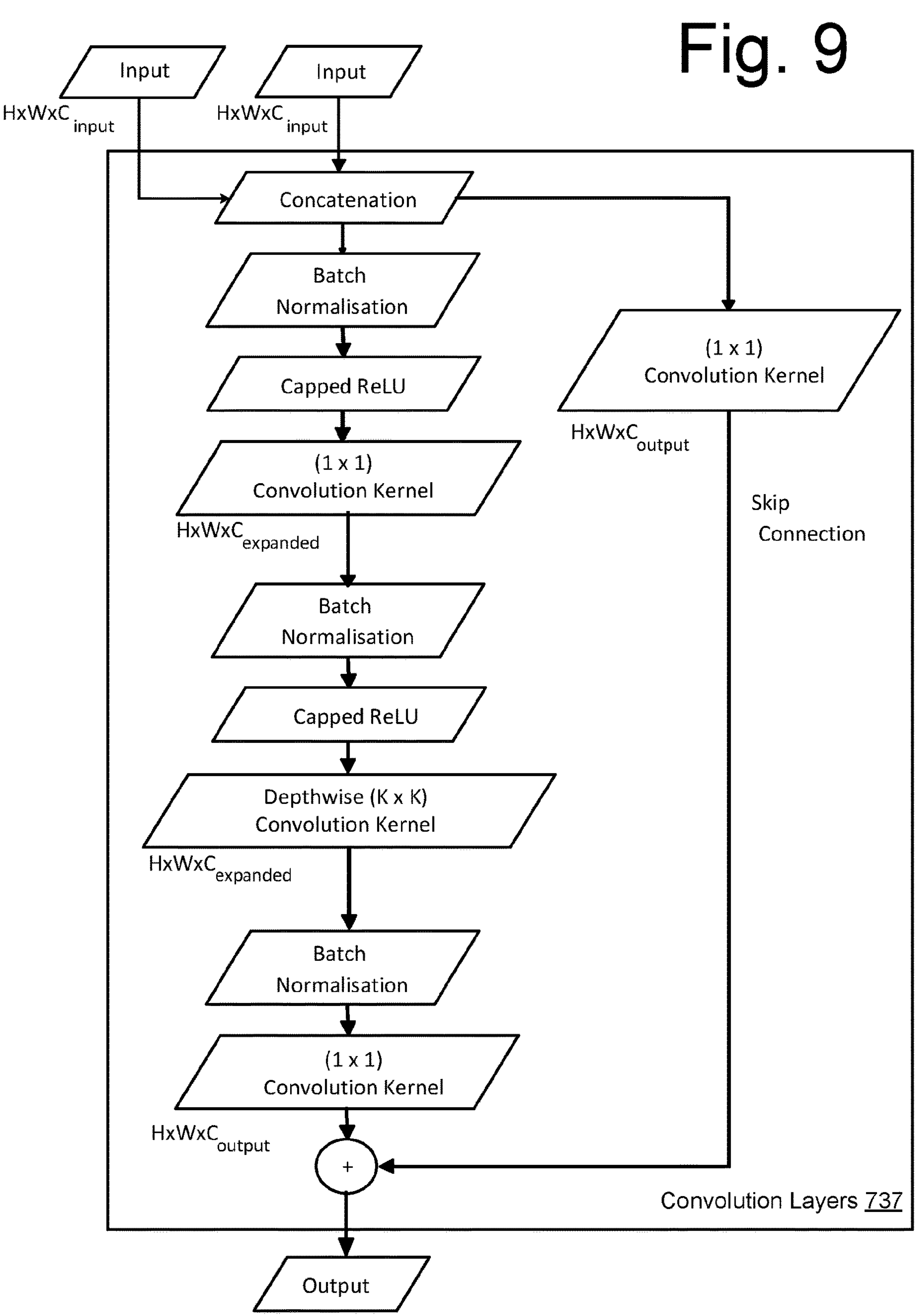

FIG. 8A is a block flow diagram schematically illustrating an exemplary implementation of a base block of convolution layers 733 to down-sample the input from a single previous layer (or an input layer, not shown, that receives the input medical image data 225). Each block of convolution layers 733 in the layer segmentation encoder path 111-1*a* may be implemented by a stack of the base convolution block shown in FIG. 8A, providing a combination of convolutions and depth-wise convolutions to expand or contract the number of feature channels, each preceded by a batch normalization layer and a rectified linear unit (such as ReLU or a capped-ReLU), followed by a max pooling operation (e.g. 2×2) for down-sampling. As shown, this exemplary base convolution block 733 has a skip connection that serves to match the number of channels between the input and the residual tensors before adding them to generate the final output tensor. As generally known in deep networks, such residual blocks significantly reduces the effects of vanishing gradients.

Figure 8B:
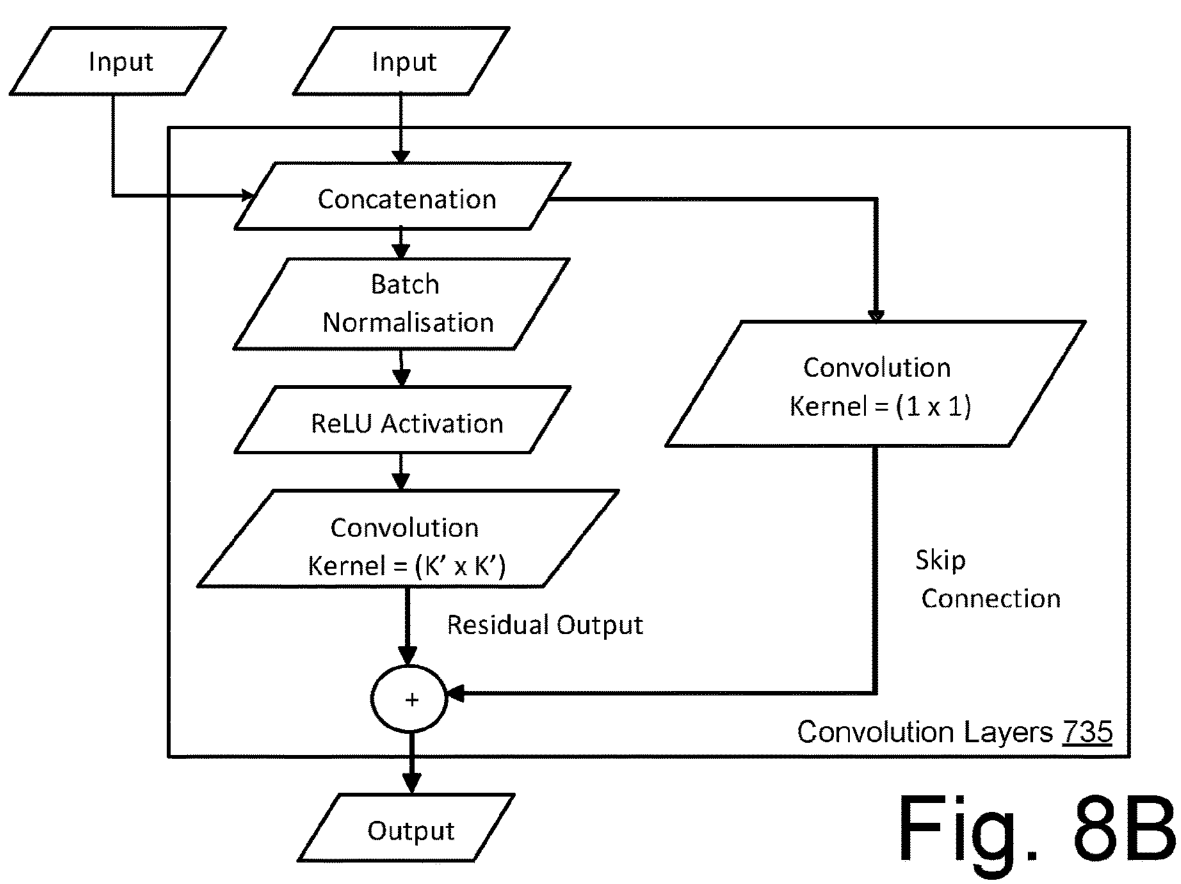

FIG. 8B is a block flow diagram schematically illustrating an exemplary implementation of another block of convolution layers 735 to down-sample the input from two or more previous layers. Each block of convolution layers 735 in the layer segmentation decoder path 111-1*b* and the boundary encoder path 111-2*a* may be implemented by a stack of the convolution blocks shown in FIG. 8B, to provide up-sampling of the features followed by a plurality of convolution layers (e.g. a 2×2 up-convolution to reduce the number of feature channels, and a combination of 3×3 convolutions), each preceded by a batch normalization layer and ReLU. As shown, the convolution blocks shown in FIG. 8B include an additional layer to concatenate the inputs from the previous layer in the path with inputs from a previous layer in a previous tower. Inter-tower skip connections serve to preserve features while enabling direct propagation of gradients from very deep layers to shallow layers. The intermediate segmentation prediction and final boundary prediction form complementary tasks that when inferenced jointly can significantly increase performance in both tasks over the performance from training each task separately.

Table 1 sets out an exemplary configuration of the blocks of convolution layers 733, 735 in the segmentation network 111-1 shown in FIG. 7. It will be appreciated that these settings are merely illustrative and the number and size of network elements are configurable depending on the specific implementation context, for example to modify the resulting processing resolutions.

TABLE 1

| Segmentation Encoder 111-1a | | | | Segmentation Decoder 111-1b | | | |
|---|---|---|---|---|---|---|---|
| Block | Channel Out | Kernel (K × K) | Block Type | | Channel Out | Kernel (K × K) | Block Type |
| 733a | 32 | 3 × 3 | FIG. 8A | 535-1a | 112 | 3 × 3 | FIG. 8B |
| | 16 | 3 × 3 | FIG. 8A | | 112 | 3 × 3 | FIG. 8B |
| | 24 | 3 × 3 | FIG. 8A | | | | |
| | 24 | 3 × 3 | FIG. 8A | | | | |
| 533b | 40 | 5 × 5 | FIG. 8A | 535-1b | 80 | 3 × 3 | FIG. 8B |
| | 40 | 5 × 5 | FIG. 8A | | 80 | 3 × 3 | FIG. 8B |
| 533c | 80 | 3 × 3 | FIG. 8A | 535-1c | 24 | 3 × 3 | FIG. 8B |
| | 80 | 3 × 3 | FIG. 8A | | 24 | 3 × 3 | FIG. 8B |
| | 80 | 3 × 3 | FIG. 8A | | | | |
| | 112 | 5 × 5 | FIG. 8A | | | | |
| | 112 | 5 × 5 | FIG. 8A | | | | |
| 533d | 192 | 5 × 5 | FIG. 8A | | | | |

Referring back to FIG. 7, the subsequent boundary prediction network 111-2 is then used to generate boundary surface prediction values 229 from the segmentation prediction values 227 received from the segmentation network 111-1. In the present exemplary embodiment, the output of the segmentation network 111-1 is a segmentation map 227 where each pixel may contain one or more class labels represented as probability values of that pixel belonging to a segmented layer. Preferably but not necessarily, the resolution of the output segmentation map 227 matches the resolution of the input medical image 225. For example, the output data may be a layer segmentation probability map 227, including probability values for each input pixel (i.e. the output data 227 having dimensions Width×Height: M, where M is a defined or machine-learned number of segmented layer classes). As those skilled in the art will appreciate, the output data may have dimensions Width×Height: M×K in the alternative embodiments where the networks 111 are configured to process an input slabs of 3D volumetric medical image, where K is the pixel thickness of each slab.

As shown, the encoder path 111-2*a* of the boundary prediction network 111-2 feeds the segmentation prediction data 227 from the segmentation network 111-1 along with intermediate outputs from earlier layers (for example convolution layers 733*a*, 733*b* and 733*d*, and multi-scale pooling layers 231-1) through a sequence of down-sampling convolution layers 737. Optionally, the boundary encoder path 111-2*a* may also include multi-scale pooling layers 231-2, such as an ASPP layer 231', to further improve learning efficiency, both in reducing training time and increased boundary prediction performance, by allowing the network to learn multi-scale contextual features.

FIG. 9 is a block flow diagram schematically illustrating an exemplary implementation of a block of convolution layers 737 to down-sample the input from the segmentation network 111-1. Each block of convolution layers 737 in the boundary encoder path 111-2*a* may be implemented by a stack of the convolution blocks shown in FIG. 9. As shown, each block of convolution layers 737 includes an additional combination of convolution and depth-wise convolution layers to reduce computation in deeper network designs. A capped ReLU activation function, where the activation is capped at some maximum value, is used to combat explosive gradients. Table 2 sets out an exemplary configuration of the blocks of convolution layers 737 in the boundary prediction network 111-2 shown in FIG. 7, corresponding to the configuration settings set out in Table 1. It will again be appreciated that the number and size of elements are configurable, for example depending on the specific implementation context.

TABLE 2

| Boundary Encoder 111-2 | | | |
|---|---|---|---|
| Block | Channel Out | Kernel (K × K) | Block Type |
| 737a | 32 | 3 × 3 | FIG. 9 |
| | 16 | 3 × 3 | FIG. 9 |
| | 16 | 3 × 3 | FIG. 9 |
| | 24 | 3 × 3 | FIG. 9 |
| | 24 | 3 × 3 | FIG. 9 |
| | 24 | 3 × 3 | FIG. 9 |
| 737b | 48 | 5 × 5 | FIG. 9 |
| | 48 | 5 × 5 | FIG. 9 |
| | 48 | 5 × 5 | FIG. 9 |
| 737c | 88 | 3 × 3 | FIG. 9 |
| | 88 | 3 × 3 | FIG. 9 |
| | 88 | 3 × 3 | FIG. 9 |
| | 88 | 3 × 3 | FIG. 9 |
| | 88 | 3 × 3 | FIG. 9 |
| | 120 | 5 × 5 | FIG. 9 |
| | 120 | 5 × 5 | FIG. 9 |

TABLE 2-continued

| Boundary Encoder 111-2 | | | |
|---|---|---|---|
| Block | Channel Out | Kernel (K × K) | Block Type |
| 737d | 208 | 5 × 5 | FIG. 9 |
| | 208 | 5 × 5 | FIG. 9 |
| | 208 | 5 × 5 | FIG. 9 |
| | 208 | 5 × 5 | FIG. 9 |
| | 208 | 5 × 5 | FIG. 9 |
| | 352 | 3 × 3 | FIG. 9 |
| | 352 | 3 × 3 | FIG. 9 |
| | 1408 | 1 × 1 | Vanilla Conv. Layer |

The output from the encoder path 111-2*a* is passed to a block of output layers 111-2*b*, which may include one or more layers to perform global average pooling, dense output, and reshaping of the output from the boundary encoder path 111-2*a*. The values from the output layers 111-2*b* of the boundary prediction network 111-2 define boundary surface prediction values 229 of the segmented layers predicted by the segmentation network 111-1. For example, the boundary surface predictions 229 may be a matrix of L boundary surface values for each pixel location along the width W of an input B-scan image 225, where L is a number of defined biological tissue layers to predict. As discussed above, the predicted boundary values may be defined relative to a adjacent boundary or defined relative to an edge of the image. The boundary surface predictions 229 may be stored in a memory and/or passed to a trained disease predictor module 117 to be processed for further disease analysis and/or prediction, depending on the specific implementation context of the system 101.

The analysis module 107 may be adapted to generate a thickness map of the defined set of tissue layers in the source medical image from predicted thickness values output by the boundary prediction network 111-2. For example, in the exemplary implementation context of analysing OCT images, the analysis module 7 may generate a thickness map of retinal layers following a spatial correspondence to an en-face source OCT image. The B-scans of an OCT volume may be input as input images to the analysis module 107, and processed by the sub-networks 111 to output predicted layer boundary surfaces across each cross-sectional slice through the OCT volume. The analysis module 107 may be configured to combine the thickness information across the OCT volume to create full volumes. For example, the boundary surface predictions for each of the N B-scan input images may be 'stitched' together, by interpolating across the N predicted W×L matrix outputs from the boundary prediction network 111-2, to produce an en-face thickness map for each tissue layer.

Figure 11:
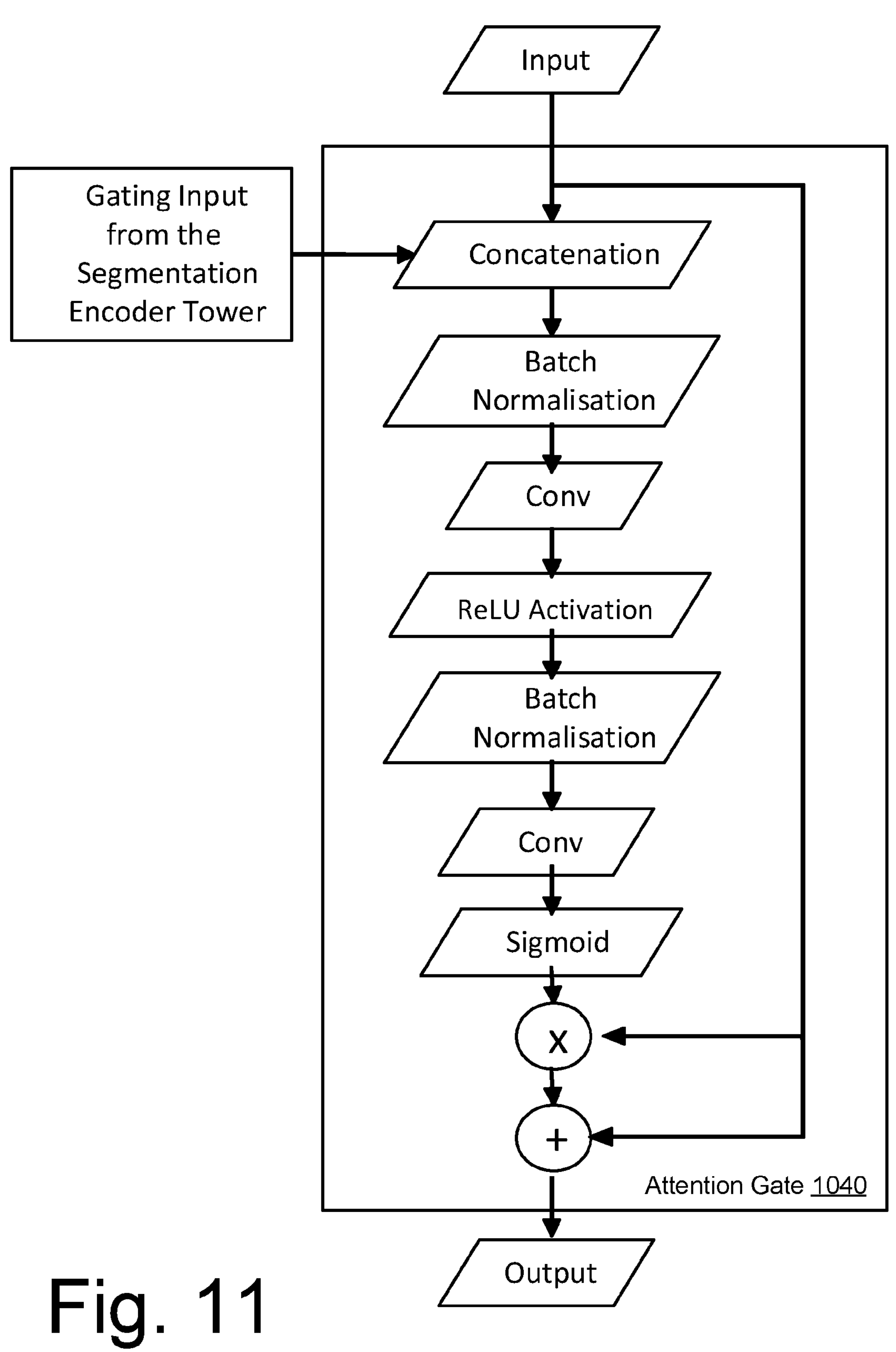
FIG. 11 shows an exemplary architecture of the attention gates shown in FIG. 10.

FIG. 10 is a block flow diagram schematically illustrating the network architecture of the layer prediction model 109 according to an exemplary alternative implementation. As shown, the alternative architecture may include additional attention gates 1040 provided before each convolution layer 733 in the boundary encoder path 111-2*a* of the boundary prediction network 111-2. FIG. 11 schematically illustrates an exemplary architecture of an attention gate 1040 shown in FIG. 10. As shown, outputs from the segmentation encoder path 111-1*a* of the segmentation network 111-1 are concatenated with inputs in the boundary encoder path 111-2*a* to obtain an attention map for channel-wise weighting of the inputs to each convolution layer 737. In this way, information from earlier layers in the segmentation encoder path 111-1*a* is effectively used to help the boundary prediction network to learn and focus only on relevant information. Advantageously, this results in faster training and improved boundary surface prediction performance.

FIG. 12 is a block flow diagram schematically illustrating the network architecture of the layer prediction model 109 according to another exemplary alternative implementation. As shown, the sub-networks of the trained model 109 in this alternative architecture each implement a modified U-Net architecture that advantageously allows each sub-network to be fully trained on relatively few training images and perform segmentation and boundary prediction with greater accuracy. The segmentation network 111-1 is similar to the implementation shown in FIG. 7 and processes input source image data 225 to generate segmentation predictions 227 that are passed to an input layer of the boundary prediction network 111-2'. The boundary encoder path 111-2*a* of the boundary prediction network 111-2' is also similar to the implementation shown in FIG. 7 and down-samples the input segmentation predictions 227 from the segmentation network 111-1. However, in this alternative, the output of the encoder path 111-2*a* is then passed to a respective decoder path 111-2*b'* that feeds the data through a sequence of up-sampling convolutional layers 1235. The output from the layer segmentation decoder path 111-2*b'* is passed to one or more output layers 1239 of the boundary prediction network 111-2, such as a dense output layer, trained to output boundary surface prediction values 229 of the segmented layers predicted by the segmentation network 111-1. It will be appreciated that the inter-tower skip connections between the sub-networks 111 may be omitted, as indicated by the dashed lines in FIG. 12.

Returning to FIG. 6, at step S6-7, the disease predictor module 117 may be used to process the prediction outputs received from the analysis module 107, and to output data identifying a predicted classification of a predicted disease and/or a disease-related prediction. For example, following from the above exemplary implementation context of analysing OCT images, the disease predictor module 117 may receive and process predicted layer segmentation probability map and boundary surface prediction data, to output disease prediction data such as OCT-based biomarkers, a clinical diagnosis, etc. to a device such as the display 121. Examples of disease-related prediction data include disease progression, phenotyping/sub-clustering of heterogenous diseases across temporal and spatial features, etc. At step S6-9, the augmented image generator 119 may be used to generate an augmented representation of the reconstructed boundaries between predicted layers in the source medical image, determined from the layer segmentation prediction data generated at step S6-3 and the predicted boundary surface values generated at step S6-5. For example, the augmented representations may include boundaries between visible tissue layers in the source medical image, determined from the identification of layers in a segmentation prediction map 229 output by the segmentation network 111-1 and the predicted boundary surfaces between identified layers. As those skilled in the art will appreciate, the augmented representations may be overlaid on respective slices of 3D volumetric medical image data from an OCT scanner. The augmented representation(s) may be output by the device 103, for example to the display 121 via the display interface 123, at step S6-11.

Figure 13:
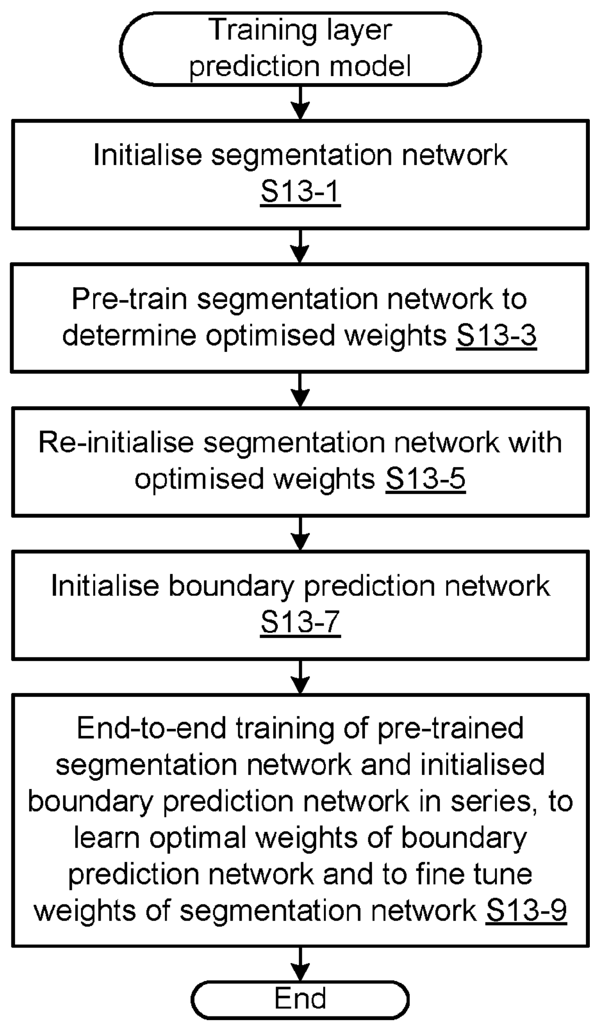
FIG. 13 is a flow diagram of an exemplary process of training the sub-networks of the layer prediction model, according to another aspect of the first embodiment.

FIG. 13 is a flow diagram of an exemplary process of training the sub-networks 111 of the layer prediction model 109, according to another aspect of the present embodiment. In the illustrated exemplary embodiment, the training module 113 is configured to train the segmentation network 111-1 first, independently from the boundary prediction network 111-2. Accordingly, at step S13-1, the training module 113 initialises the segmentation network 111-1, for example with random weight values. At step S13-3, the training module 113 performs pre-training of the segmentation network 111-1, to determine optimised network weight values based on training data including medical images with respective segmentation maps (e.g. the graded segmentation labels per training image pixel or voxel). For example, the training module 113 may process the training medical images input to the segmentation network 111-1, to output corresponding segmentation maps based on the current weight parameter values. The training module 113 can determine updates to the network to minimise a calculated difference between the training segmentation maps and the segmentation map output by the segmentation network 111-1.

More particularly, the training module 113 may be configured to minimise a gradient of a loss function with respect to the current weights of the segmentation network 111-1, until it converges to a local minima. For example, the loss function may be a weighted cross-entropy loss function, where higher weights are given to pixels at the border thus acting like a quick attention scheme to sharpen the edges (which advantageously provides a smoother gradient function leading to a better training stability). Alternatively or additionally, the loss function may be a weighted soft dice (1-Dice) loss function or a weighted intersection-over-union (IoU) loss function (1-IoU coefficient), which provides the benefit of normalising the loss with respect to the size of the segmentation mask and is therefore less susceptible to class imbalances as compared to cross entropy loss. As those skilled in the art will appreciate, any other combination of suitable classification loss functions may be implemented. In response to determining that the predefined training termination criteria are met, the training module 113 may store the trained weight parameter values of the segmentation network 111-1, for example in a memory.

At step S13-5, the training module 113 may re-initialise the segmentation network 111-1, for example by loading the resulting optimised trained weights of the segmentation network 111-1 (from step S13-5) as the initialisation weights for the sub-network if necessary. At step S13-7, the training module 113 initialises the boundary prediction network 111-2, for example with random weight values. At step S13-9, the training module 113 performs end-to-end training of the pre-trained segmentation network 111-1 and the initialised boundary prediction network 111-2, connected in series. In this way, the training module 113 determines optimal weights of the trained boundary prediction network 111-2, while concurrently fine-tuning the weights of the segmentation network 111-1 from step S13-3, based on optimising for correct boundary surface predictions.

The training module 113 determines optimised network weight values for both sub-networks 111 of the layer prediction model 109 using the input training medical images with associated sets of boundary surface values for each tissue layer, for example derived from the graded training images. For example, the training module 113 may process the training medical images input to the segmentation network 111-1, output respective segmentation map data 227 to the boundary prediction network 111-2, process the segmentation map data 227 input to the boundary prediction network 111-2, and output predicted boundary surface values 229 based on the current weight parameter values of both the segmentation network 111-1 and the boundary prediction network 111-2.

The training module 113 can determine updates to the network to minimise a calculated difference between the training boundary surface values and the boundary surface predictions 229 output by the boundary prediction network 111-2. Similar to step S13-3 above, the training module 113 may be configured to minimise a gradient of a loss function, but now with respect to the current weights of both the segmentation network 111-1 and the boundary prediction network 111-2, until the gradient converges to a local minima. For example, the loss function may be a huber loss function (which provides the advantage of being less sensitive to outliers, e.g. as compared to L1 loss function errors, but remains differentiable throughout, unlike L1).

It will be appreciated that any other combination of suitable regression loss functions may be implemented by the training module 113. The training module 113 may be further configured to compute the gradients using back-propagation. The training module 113 may also be configured to tune a hyper-parameter within the loss function itself. Alternatively or additionally, the training module 113 may be configured to employ early stopping to prevent overfitting by comparing the trajectories of the training loss versus validation loss. Specifically, the training module 113 may terminate training when a statistical criteria is crossed indicating that the validation error is increased against the training error. In response to determining that the predefined training termination criteria are met, the training module 113 may store the trained weight parameter values of the segmentation network 111-1 and the boundary prediction network 111-2, for example in a memory.

Those skilled in the art will also appreciate that in the network architecture shown in FIGS. 7, 10 and 12, the training module 113 may be configured to perform end-to-end training of both the segmentation network 111-1 and the boundary prediction network 111-2 of the layer prediction model 109 together, without initial optimisation of the segmentation network 111-1. One advantage of the two-step training protocol (i.e. training first sub-network 111-1 first followed by co-training the first sub-network 111-1 connected to second sub-network 111-2 with the pre-trained 111-1 weights as initialisation), is that it allows for flexibility on how to pre-train the first sub-network 111-1 to optimise the initialisation of the first sub-network 111-1 before co-training with the second sub-network 111-2.

Second Embodiment

Figure 14:
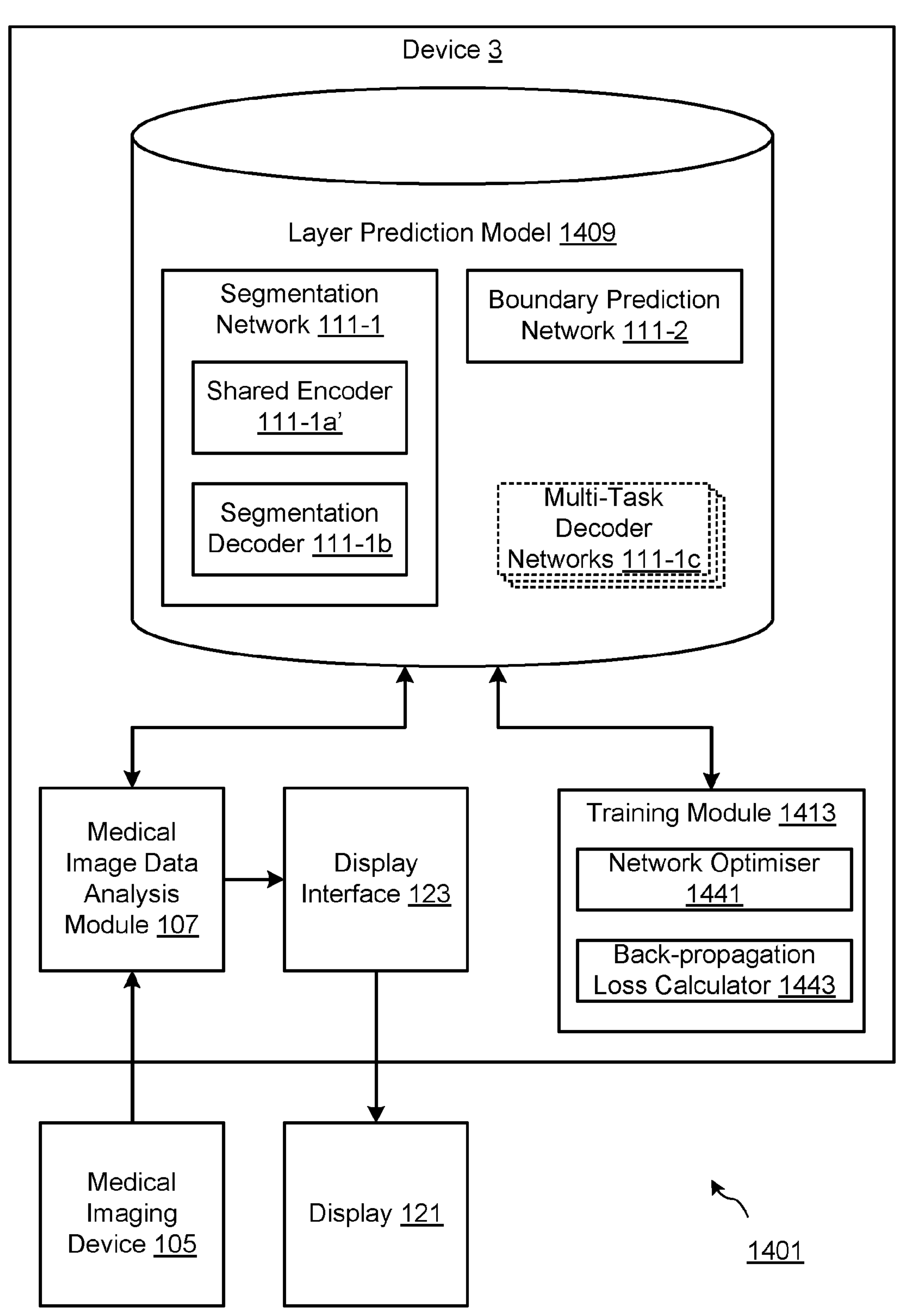
FIG. 14 is a block diagram showing the main components of a medical image processing system according to a second embodiment of the invention.

FIG. 14 is a block diagram of a medical image processing system 1401 configured to automatically analyse and determine layer structure from medical image data 225 acquired from a medical imaging device 105 using an analysis module 107, according to a second embodiment. Corresponding reference numerals to those of preceding figures are used where appropriate for corresponding elements. Similar to the first embodiment described above, the medical image data analysis module 107 uses a trained layer prediction model 1409 to process acquired medical image data and to output data indicating predicted layer segmentations and boundary surface predictions of tissue layers in the source medical image.

In the embodiment, the layer prediction model 1409 includes additional network components that are used in the process of training the segmentation network 111-1, to provide better predicted layer segmentation from input medical image data. As shown, the layer prediction model 1409 of the present embodiment further includes a plurality of task-specific decoder networks 111-1*c* associated with respective prediction tasks. The multi-task decoder networks 111-1*c* are illustrated with dashed lines to schematically represent a temporary nature of the additional network components, which are used by the training module 1413 to improve training of the segmentation network 111-1 and then disconnected and discarded. As will be described in greater detail below, predefined outputs of the layer segmentation encoder 111-1*a*, such as outputs of the multi-scale pooling layers 231-1, are connected to respective input layers of the multi-task decoders 111-1*c* during pre-training of the segmentation network 111-1. Consequently, the layer segmentation encoder 111-1*a* is referred to as a shared encoder 111-1*a*' in the present embodiment, configured to provide output values to the multi-task decoder networks 111-1*c* in addition to the layer segmentation decoder 111-1*b*.

Related tasks can include tasks with information that a primary task of interest (e.g. layer segmentation and/or boundary surface prediction) may leverage. For example, the additional task-specific decoders 111-1*c* may include image-level disease classification, segmentation of abnormalities such as sub-retinal fluids, cysts, etc., and object boundary prediction (e.g. edge prediction).

The training module 1413 uses the additional multi-task decoder networks 111-1*c* to pre-train the segmentation network 111-1, thereby implementing a multi-task configuration to leverage related tasks to the layer segmentation decoder 111-1*b*. The training module 1413 updates the network weight parameters of the segmentation network 111-1, using input training data including medical images with associated task-specific classification labels, by learning optimal network weights to minimise a weighted-combination of back-propagated task-specific loss functions based on the training data. The training module 1413 may include a segmentation network optimiser module 1441 to update the weight parameter values of the segmentation network 111-1, in particular the shared encoder 111-1*a*' portion, taking into account a back-propagated loss calculated by a back-propagation loss calculator module 1443 as a weighted combination of task-specific loss functions.

Once the segmentation network 111-1 (together with the multi-task decoder networks 111-1*c*) is pre-trained, the multi-task decoder networks 111-1*c* are disconnected and the corresponding trained weights discarded. The resulting pre-trained segmentation network 111-1 is then connected to the initialised boundary prediction network 111-2 and trained/tuned, as discussed above in the first embodiment. In this way, the present embodiment provides further improvements to the training process, the resulting trained model, and thereby prediction performance of the model as a whole, by leveraging machine-learned useful information from related prediction tasks.

FIG. 15 is a block flow diagram schematically illustrating the architecture and data flows of the segmentation network 111-1 and the training module 1413, according to the improved training aspects of the present embodiment. As shown, training of the segmentation network 111-1 in the present embodiment further involves a plurality of connected task-specific decoder networks 111-1*c* that are trained to predict respective tasks, simultaneously. Each task may have a separate associated decoder 111-1*c*-1 to 111-1*c*-*n* having a respective structured arrangement of nodes including an input layer and an output layer. Each task-specific decoder 111-1*c* receives output values from the shared encoder 111-1*a*', for example outputs from the multi-scale pooling layers 231-1, to an input layer of task-specific decoder 111-1*c*. The task-specific decoders 111-1*c* output respective task-specific prediction data 1545 to the training module 1413. Each task-specific decoder 111-1*c* may have a different network architecture to the layer segmentation decoder 111-1*b*.

In this exemplary embodiment, the shared encoder 111-1*a*' is configured to feed input medical image data 225 from an input layer 1531 through a sequence of down-sampling layers 533, followed by the multi-scale pooling layers 231-1 providing additional atrous convolution, as described with reference to the layer segmentation encoder 111-1*a* in FIG. 7 of the first embodiment. The outputs of the shared encoder 111-1*a*', including the skip connections 112 from encoder to decoder (and any residual skip connections between consecutive layers), are passed to the layer segmentation decoder path 111-1*b* as also described above with reference to FIGS. 7 to 9.

In the exemplary implementation schematically illustrated in FIG. 15, the output of the multi-scale pooling layers 231-1 of the shared encoder 111-1*a*' is also passed to each one of the additional task-specific decoder networks 111-1*c*-1 to 111-1*c*-*n*, each trained to output data values of a respective task-specific prediction (i.e. in addition to the layer segmentation task). For example, the output prediction data 1545 of each decoder 111-1*c* may be an abnormalities segmentation probability map (having dimensions Width×Height×M, where M is a defined or machine-learned number of segmented abnormality classes), a diseases (and normal) classification probability map (having dimensions I×C, where C is the number of classes), or an object boundary probability map (having dimensions Width×Height×B, where B is a defined or machine-learned number of segmented object classes). As those skilled in the art will appreciate, the output data may have an extra dimension K in the alternative embodiments where the layer prediction model 1409 is configured to receive and process input medical image data of higher dimensionality. For example, the input medical image data may be slabs through a 3D volumetric medical image, where K is the pixel thickness of each slab that is greater than 1. As another example, the input medical image data may be the 3D volumetric data itself, where K is the pixel depth of the volume.

The back-propagation loss calculator 1443 may include a separate loss calculator 1547 to receive and process the task-specific prediction values 1545-1 to 1545-*n* output by the respective task-specific decoders 111-1*c*-1 to 111-1*c*-*n*. Each loss calculator 1547 may implement a respective loss function to determine a task-specific loss value 1549 with respect to the current network weight parameters, based on the difference between the associated training data values and the task-specific predictions 1545 output by the respective task decoders 111-1*c* of the layer prediction model 1409. A weighted loss combiner module 1551 computes the gradient of a combined loss function, as a weighted-combination over the calculated losses 1549 of each task. The optimiser 1443 is configured to update the weight parameters of the multi-task prediction network 111-3, in particular back-propagating the combined loss through the shared encoder 111-1*a*' and the multi-task decoder networks 111-1*c*.

In this way, the improved network architecture allows the segmentation network 111-1 to leverage features for related tasks, enabling better machine learning by the system 1401 that learns more informative embeddings to improve the prediction performance of the segmentation task of interest. For example, compared to the first embodiment, layer segmentation and boundary surface predictions are more accurate as a result of the simultaneous training of additional parallel task-specific decoders 111-1*c* using the same set of training data. Additionally, processor and memory resource usage is further improved as the segmentation network 111-1 can be trained over smaller sample sets of medical images, since the shared encoder 111-1*a*' is effectively optimised to learn features that are mutually beneficial over the different related tasks.

Figure 16A:
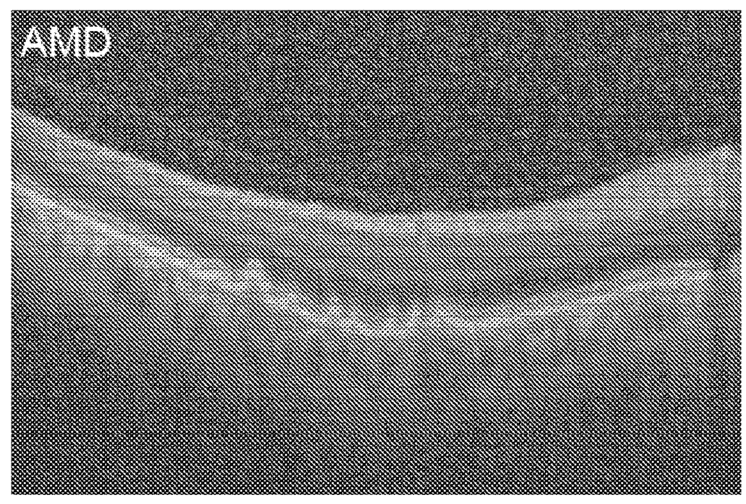
FIGS. 16A to 16F, are additional examples of images of patients' eyes showing signs of respective detectable conditions, and corresponding augmented versions based on the predicted layer boundaries output by the improved model of the second embodiment.
Figure 16B:
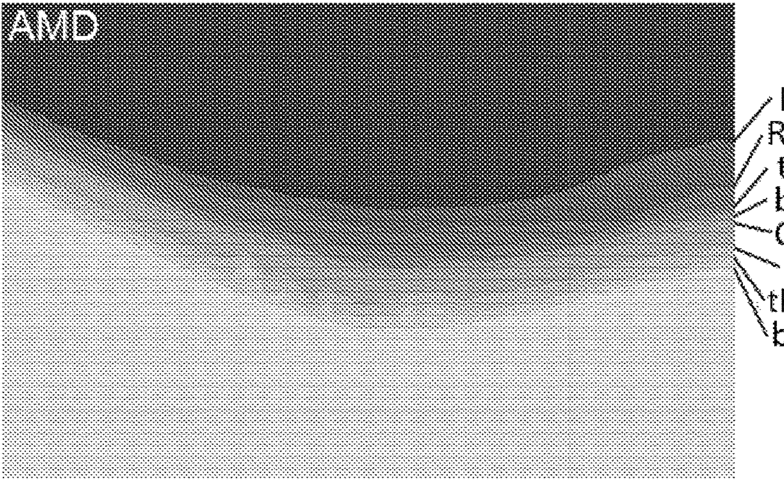
Figure 16C:
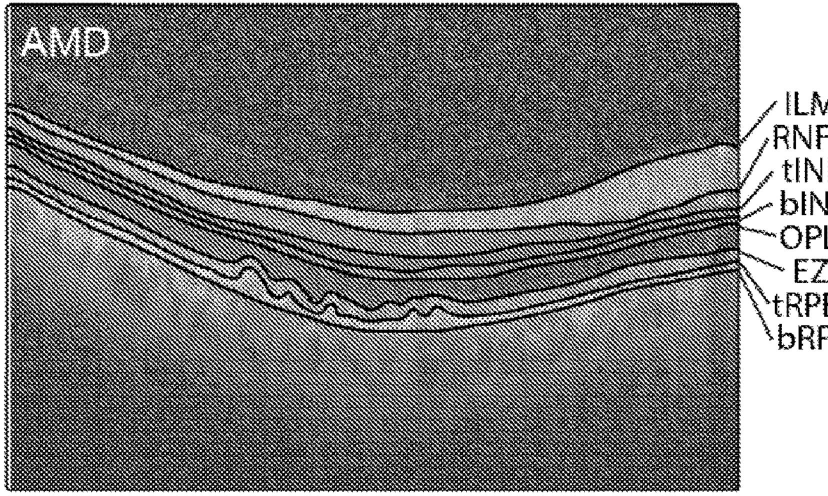
Figure 16D:
Figure 16E:
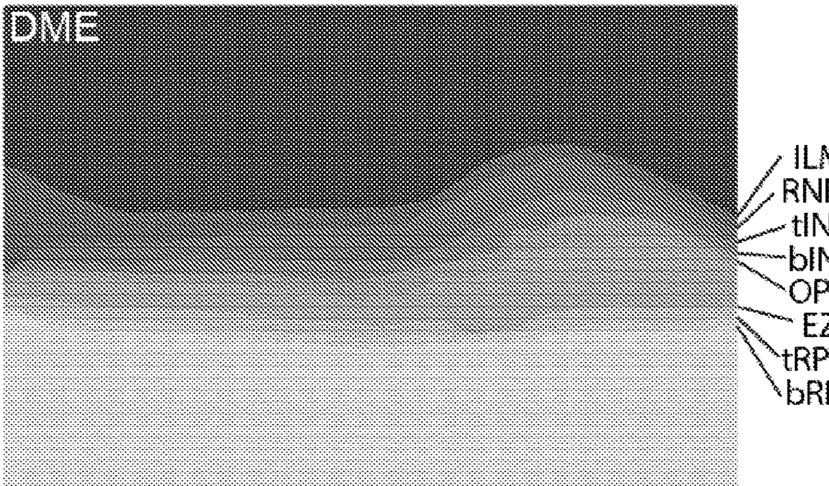
Figure 16F:
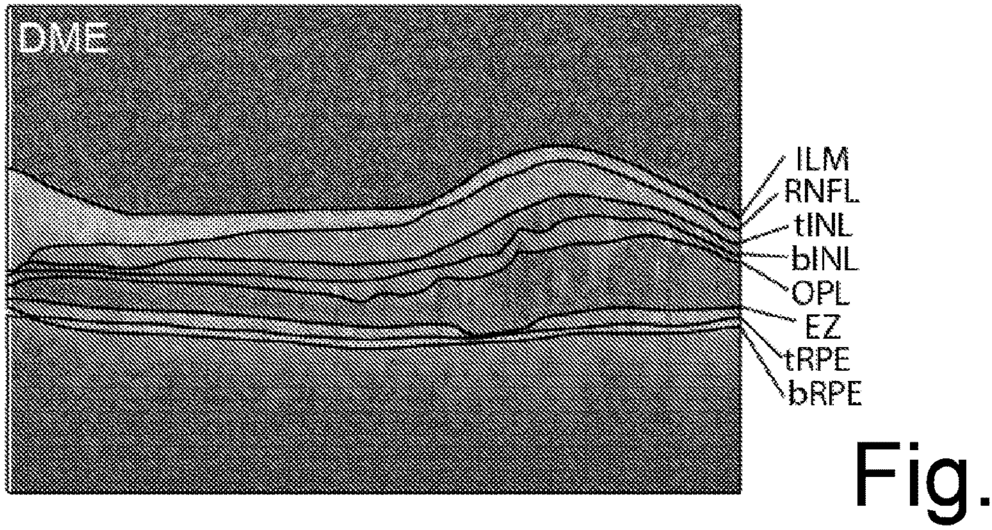

FIG. 16, which comprises FIGS. 16A to 16F, are further examples of OCT scans of a retina exhibiting presence of respective conditions. FIG. 16A is an example of an OCT scan of a retina from a patient with age related macular degeneration (AMD) and FIG. 16B schematically illustrates the corresponding segmented layers. FIG. 16D is an example of an OCT scan of a retina from a patient with Diabetic Macular Edema (DME) and FIG. 16E schematically illustrates the corresponding segmented layers. In these exemplary cases, there are several additional visible features to the retina, such as presence of fluids in one or more of the segmented layers, particularly noticeable from a comparison with the example of a normal retina in FIG. 4A. As shown in the respective corresponding augmented versions of FIGS. 16C and 16F, each additional layer abnormalities (fluid deposits, cellular deposits, separation or loss) is detected as a feature by the multi-task prediction network 111-3 of the present embodiment. In particular, the multi-task decoders effective provide for multiple task-specific predictions to be taken into account, enabling the multi-task prediction network 111-3 to properly detect and handle segmentation of additional (e.g. unexpected) features.

Figure 17:
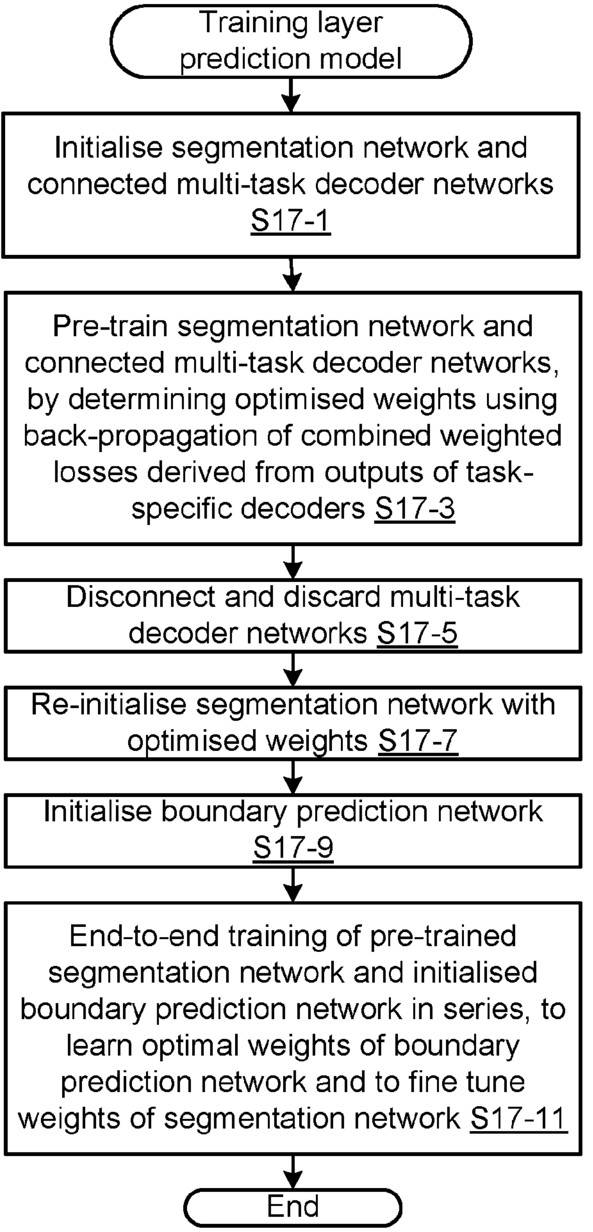
FIG. 17 is a flow diagram of an exemplary process of training the sub-networks of the layer prediction model according to the second embodiment.

FIG. 17 is a flow diagram of an exemplary process of training the sub-networks 111 of the layer prediction model 1409, according to another aspect of the present embodiment. In the illustrated exemplary embodiment, the training module 1413 is configured to pre-train the multi-task prediction network 111-3, independently from the boundary prediction network 111-2. Accordingly, at step S17-1, the training module 1413 initialises the weight parameters of the segmentation network 111-1 and the connected plurality of multi-task decoder networks 111-1*c*. At step S17-3, the training module 1413 pre-trains the segmentation network 111-1 using the training data, to determine optimised weight parameter values of the shared encoder 111-1*a*' and the layer segmentation decoder 111-1*b*, as well as the connected task-specific decoders 111-1*c*-1 to 111-1*c*-*n*. For example, the training module 1413 may use the segmentation network 111-1 to process the training medical images input to shared encoder 111-1*a*', and to output corresponding segmentation prediction maps 227 and respective task-specific prediction data 1545, based on the current weight parameter values.

In this embodiment, the training module 1413 determine updates to the segmentation network 111-1 to minimise a calculated difference between prediction data output by the segmentation network 111-1 and the corresponding aspects of the training data. More particularly, the training module 1413 may be configured to minimise a gradient of a combined weighted loss function with respect to the current weights of the segmentation network 111-1, until it converges to a predefined local minima. For example, the weighted loss combiner 1551 computes a weighted sum of the losses 1549 calculated across all of the related tasks by respective task-specific loss calculators 1547, using respective predefined loss functions appropriate to the associated tasks. For example, appropriate loss functions for additional segmentation-type tasks (e.g. segmentation of abnormalities like sub-retinal fluids) may be derived from a weighted cross-entropy loss function and/or a weighted soft dice (1-Dice) loss function and/or an weighted intersection-over-union (IoU) loss function (1-IoU coefficient). For any classification-type of related tasks, an appropriate loss function may be derived from a cross-entropy loss function.

At step S17-5, the training module 1413 disconnects the multi-task decoder networks 111-1*c* and discards the corresponding trained weights (leaving the pre-trained weights of the segmentation network 111-1). At step S17-7, the training module 1413 may re-initialise the segmentation network 111-1, for example by loading the pre-trained weights from step S17-3 as the initialisation weights for the segmentation network 111-1. At step S17-9, the training module 1413 initialises the boundary prediction network 111-2. At step S17-11, the training module 1413 optimises the weight parameter values of both the pre-trained segmentation network 111-1 and the initialised boundary prediction network 111-2 connected in series, using the training data, similar to step S13-9 as discussed above with reference to FIG. 13. In response to determining that predefined training termination criteria are met (e.g. converge to a predefined local minima), the training module 1413 may store the trained weight parameter values of the segmentation network 111-1 and the boundary prediction network 111-2, for example in a memory.

Third Embodiment

Figure 18:
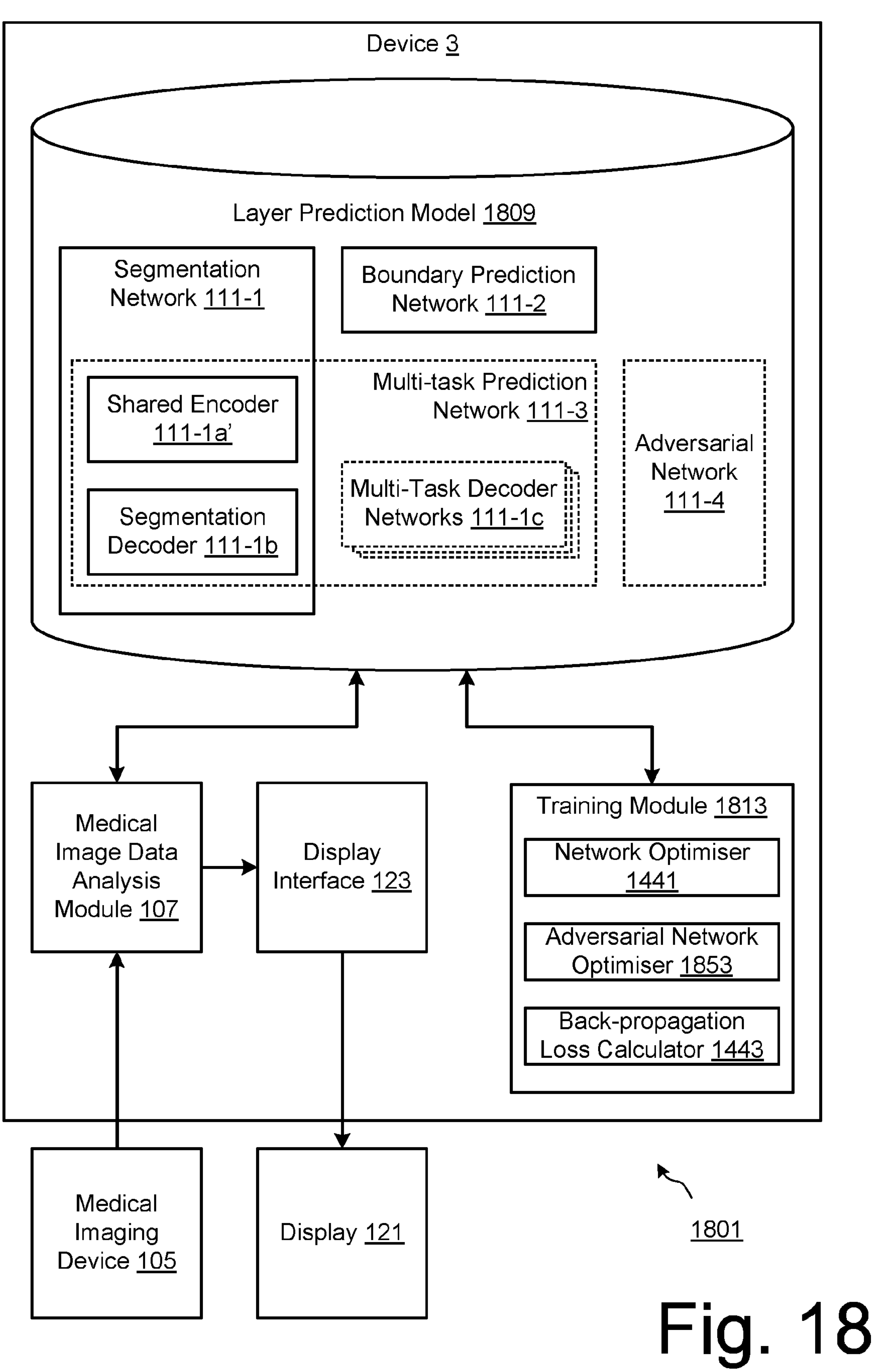
FIG. 18 is a block diagram showing the main components of a medical image processing system according to a third embodiment of the invention.

FIG. 18 is a block diagram of a medical image processing system 1101 configured to automatically analyse and determine layer structure from medical image data 225 acquired from a medical imaging device 105 using an analysis module 107, according to a third embodiment. Corresponding reference numerals to those of preceding figures are used where appropriate for corresponding elements. Similar to the embodiments described above, the medical image data analysis module 107 uses a trained layer prediction model 1809 to process acquired medical image data and to output data indicating predicted layer segmentations and boundary surfaces between tissue layers in the source medical image. However, in this embodiment, in addition to the multi-task decoder networks 111-1*c* as described in the second embodiment, the layer prediction model 1809 further includes an adversarial network 111-4 that is trained to predict confounding features that the segmentation network 111-1 should avoid as features of interest. In this embodiment, the related tasks further include confounder prediction for machine learning non-physiological features that the layer prediction model 1809 advantageously learns to remove from consideration in the main prediction tasks. Confounding information may include features encoded or captured in the input medical image data that are removed from consideration (e.g. spurious and/or non-essential, such as non-pathological and/or non-physiological features) in the predictions and decision making by the medical image data analysis module 107. This is achieved by proactively attenuating the segmentation network's use of confounding features for predicting the segmentation task of interest, for example by using output loss from the trained adversarial network to guide the multi-task network 111-3. Advantageously, the multi-task network 111-3 in this embodiment does not learn the confounding features, and instead will optimise over its tasks with less to no reliance on the confounding features. Accordingly, in this embodiment, the training module 1813 further include an adversarial network optimiser module 1853 to update the weight parameter values of the adversarial network 111-4, using an adversarial loss penalty term that is applied when back-propagating the weighted combined multi-task loss discussed in the second embodiment above.

In this way, the trained layer prediction model 1809 of the present embodiment address technical problems related to loss in prediction performance when the unseen data is out-of-sample from the training dataset distribution, due to differences manifesting from the confounding features. For example, conventional prediction networks suffer performance decrease when trying to predict outcome on patient data from different hospitals/institutions, when the source images are acquired from different machine-makes and/or forms of imaging devices, or when the source images include potential biological/physiological but non-pathological features (e.g. sex, race, age, species). A contributing factor to this kind of decrease in performance is due to the trained networks picking up idiosyncratic non-pathological information as features for making the prediction. As will be described below, the training aspects of the present embodiment advantageously improve robustness of the trained network, and consequently safety-of-use and generalizability of the machine-learning based predictions, by proactively abating prediction dependence on confounding features that would otherwise be learned and predicted by the respective task-specific decoder(s) 111-1*c* from input medical images. As shown in FIG. 18, the shared encoder 111-1*a*', the layer segmentation decoder 111-1*b*, and the multi-task decoder networks 111-1*c* of the present embodiment are collectively referred to as a multi-task prediction network 111-3. The multi-task decoder networks 111-1*c* of the multi-task prediction network 111-3 and the adversarial network 111-4 are illustrated with dashed lines to schematically represent a temporary nature of the additional network components. As will be described in detail below, these additional network components are used by the training module 1813 to further improve training of the segmentation network 111-1, and then disconnected and any trained weights discarded.

Figure 19:
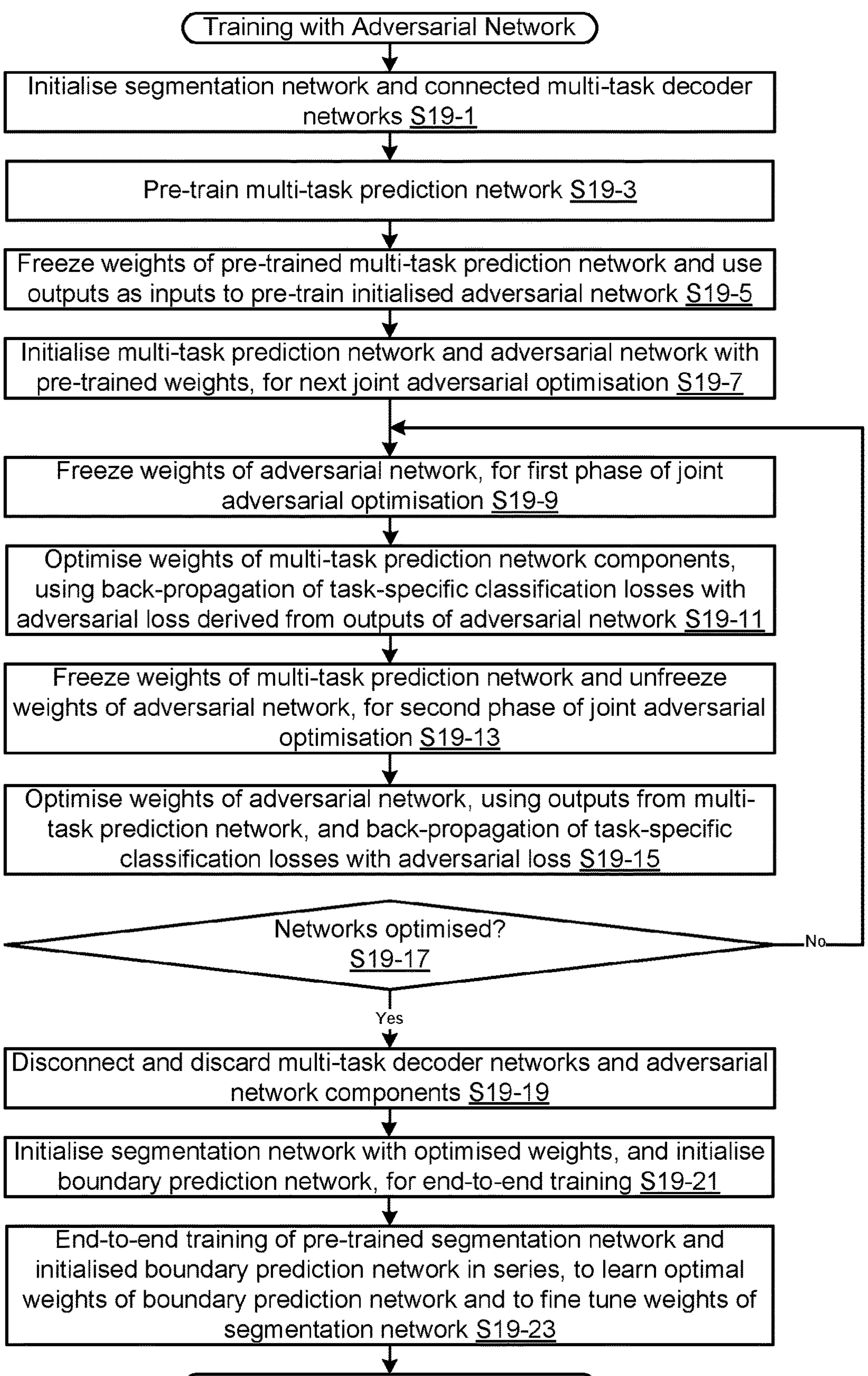
FIG. 19 is a flow diagram of an exemplary process of training the sub-networks of the layer prediction model according to the third embodiment.
Figure 20:
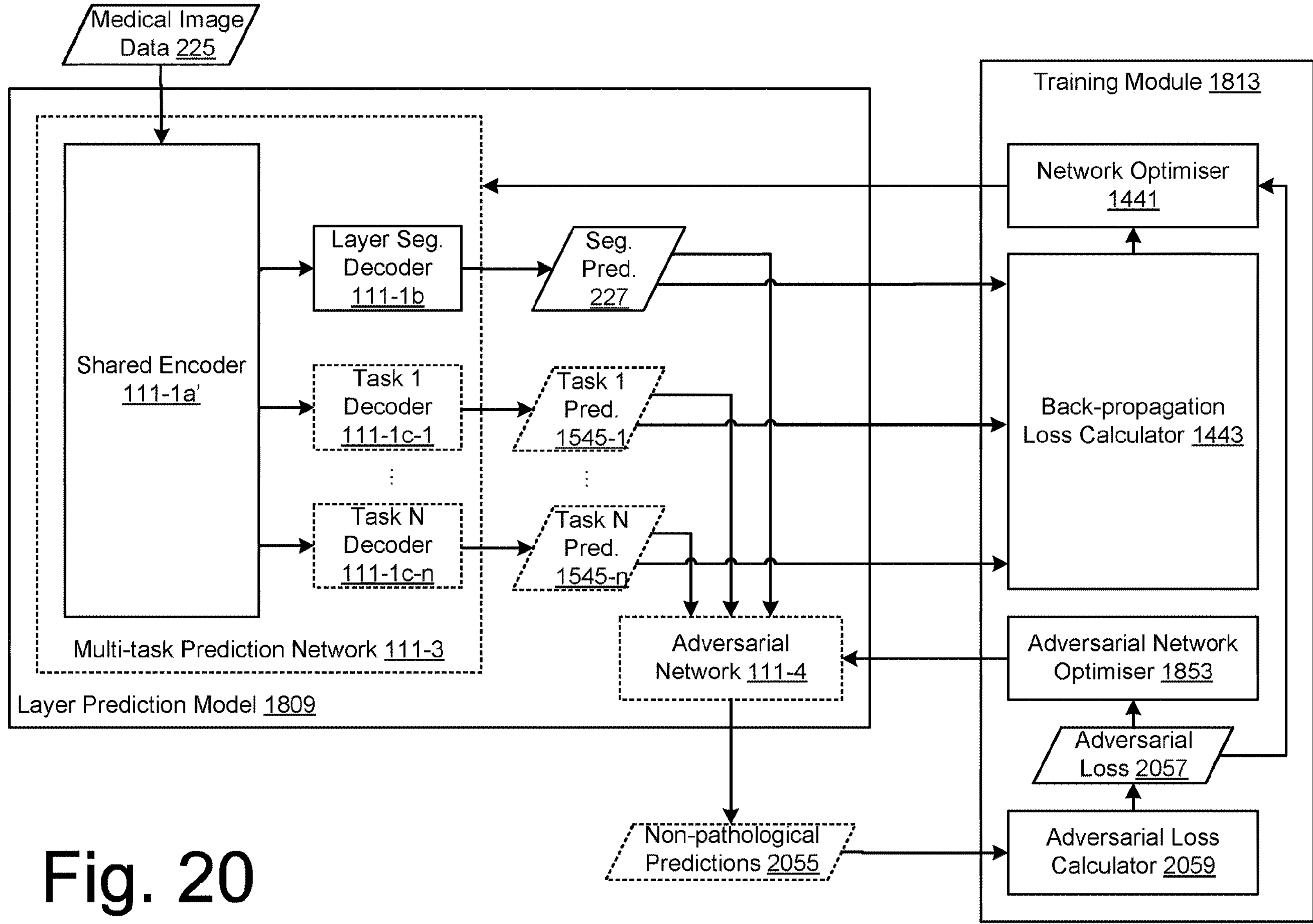
FIG. 20 is a block flow diagram schematically illustrating the architecture and data flows of the segmentation network and training module according to the third embodiment.

FIG. 19 is a flow diagram of an exemplary process of training the networks 111 of the layer prediction model 1809, according to another aspect of the present embodiment. Reference is also made to FIG. 20, which is a block flow diagram schematically illustrating the architecture and data flows of the layer prediction model 1809 and the training module 1813 of the present embodiment. Steps S19-1 and S19-3 of FIG. 19 correspond to steps S13-1 and S13-3 as discussed in the embodiment above with respect to FIG. 13, where the training module 1813 pre-trains the segmentation network 111-1 and the connected multi-task decoder networks 111-1*c*.

At step S19-5, the training module 1813 initialises the additional adversarial network 111-4, for example with random weight values, before proceeding to pre-train the adversarial network 111-4. In this exemplary embodiment, the training module 1813 freezes the pre-trained multi-task prediction network 111-3 (e.g. holding the weights of the multi-task prediction network 111-3 from step S19-3 fixed), before pre-training the adversarial network 111-4. The training module 1813 uses output from multi-task prediction network 111-3 as input to train the adversarial network 111-4 only, since the weights of the multi-task prediction network 111-3 are fixed for this training step. Using labelled training data, the adversarial network 111-4 receives the output segmentation prediction 227 as well as the task-specific predictions 1545 from the multi-task prediction network 111-3 as input, and uses the received input values to output values representing one or more confounding feature predictions 2055. For example, training data may include labels identifying the presence or absence of a confounder given a known combination of multi-task predictions 227, 1545. Adversarial loss 2057 may be calculated by an adversarial loss calculator 1359 of the training module 1813, and used by the adversarial network optimiser 1853 to determine optimisation updates to the weights of the adversarial network 111-4. Pre-training of the adversarial network 111-4 may be repeated until predefined training termination criteria are met (e.g. converge to predefined local minima).

After pre-training of the multi-task prediction network 111-3 and the adversarial network 111-4 are complete, the training module 1813 proceeds to performs a joint adversarial optimisation process to alternately optimise the adversarial network 111-4 in a separate phase from the multi-task prediction network 111-3, until multi-task performance is determined to be optimised (it is appreciated this may be at the expense of the adversarial prediction being driven down close to chance). Accordingly, at step S19-7, the training module 1813 re-initialises multi-task prediction network and adversarial network with the respective pre-trained weights from steps S19-3 and S19-5, for the next round of joint adversarial optimisation, this being the first round when step S19-7 is initially performed. At step S19-9, the training module 1813 then freezes the partially-trained adversarial network 111-4 (e.g. holding the weights of the adversarial network 111-4 from step S19-9 fixed), before a first phase of joint adversarial optimisation of the multi-task prediction network 111-3. At step S19-13, the training module 1813 determines updates to optimise the weight parameters of the multi-task prediction network 111-3 using outputs from the fixed adversarial network 111-4 to generate an adversarial loss 2057, which is then used by the network optimiser 1441 to derive the additional penalty term that is applied when back-propagating the weighted combined multi-task loss.

More particularly, the network optimiser 1441 in the present embodiment may be configured to apply a negative adversarial loss 2057, calculated by an adversarial loss calculator 2059, to the weighted sum of the losses 1549 calculated by the back-propagation loss calculator 1443 across all of the related tasks by respective task-specific loss calculators 1547, before back-propagating to determine a round of weight updates to optimise the multi-task prediction network 111-3. For example, the network optimiser 1441 may implement a loss function such as cross-entropy, with the two components: (i) task-specific classification losses 1549 as discussed in the second embodiment, used to optimise the multi-task prediction performance, and (ii) a penalty term derived from the adversarial loss 2057 from the adversarial loss calculator 2059. By applying an adversarial penalty term in this way, the multi-task prediction network 111-3 is penalised for using features that the adversarial network 111-4 has learned are useful to predict one or more confounder classifications, while aiming to optimise the multi-task prediction task. Therefore, this first phase will enable the trained multitask prediction network 111-3 to perform its prediction tasks with features that is beneficial for its own set of specific tasks, but not beneficial for the adversarial task (achieved by the negative adversarial loss function 135 which acts to penalise the multi-task shared encoder 111-1*a*' from learning features that are useful for the adversarial network 111-4).

At step S19-13, the training module 1813 unfreezes the adversarial network 111-4 (e.g. allowing the pre-trained weights of the adversarial network 111-4 from step S19-5 to be updated), and freezes the partially-trained weights of the multi-task prediction network 111-3 (e.g. holding the optimized weights of the multi-task prediction network 111-3 from step S19-11 fixed), before a second phase of joint adversarial optimisation of the adversarial network 111-4. Similar to step S19-5 above, the training module 1813 uses output from the partially trained multi-task prediction network 111-3 as input to further optimise the adversarial network 111-4 only, since the weights of the multi-task prediction network 111-3 are once again fixed for this phase. Using the labelled training data, the adversarial network 111-4 receives the output segmentation prediction 227 as well as the task-specific predictions 1545 from the multi-task prediction network 111-3 as input, and uses the received input values to output values representing one or more confounding feature predictions 2055. The adversarial network optimiser 1853 uses the resulting updated adversarial loss 2057 calculated by the adversarial loss calculator 2059 to determine a further round of optimisation updates to the weights of the adversarial network 111-4.

If the training module 111-4 determines at step S19-15 that the performance of the multi-task prediction network 111-3 is not yet optimised, for example if the adversarial network 111-4 can still predict the confounder state to a predefined level, then processing returns to step S19-9, where the weights of the adversarial network 111-4 are frozen again before the training module 1813 repeats another joint adversarial optimisation cycle. The training module 1113 continues to alternate between the first and second phases of step S19-7, until it is determined at step S19-15 that the predefined optimisation termination criteria are met. At this point, the multi-task prediction network 111-3 will be invariant to the unwanted confounding information. In this way, the trained layer prediction model 1809 in this embodiment effectively includes competing network components 111-3,111-4 such that the adversarial network 111-4 aims to predict the confounding information using the outputs from the multi-task prediction network 111-3 as input, while the multi-task prediction network 111-3 is competing to predict its outcomes in a way that features learned in the shared encoder 111-1*a*' contain little to no confounding information.

Once pre-training and optimisation is complete, the training module 1813 disconnects the multi-task decoder networks 111-1*c* and the adversarial network 111-4, at step S19-19, and may discard the corresponding trained weights (leaving the pre-trained weights of the segmentation network 111-1). Steps S19-21 and S19-23 of FIG. 19 correspond to steps S13-7 to S13-11 as discussed in the second embodiment above, where the training module 1813 performs end-to-end training to learn optimal weight parameter values for the boundary prediction network 111-2 while fine tuning the weight parameter values of the segmentation network 111-1. In response to determining that predefined training termination criteria are met (e.g. converge to a predefined local minima), the training module 1813 may store the trained weight parameter values of the segmentation network 111-1 and the boundary prediction network 111-2, for example in a memory.

Computer Systems

Figure 21:
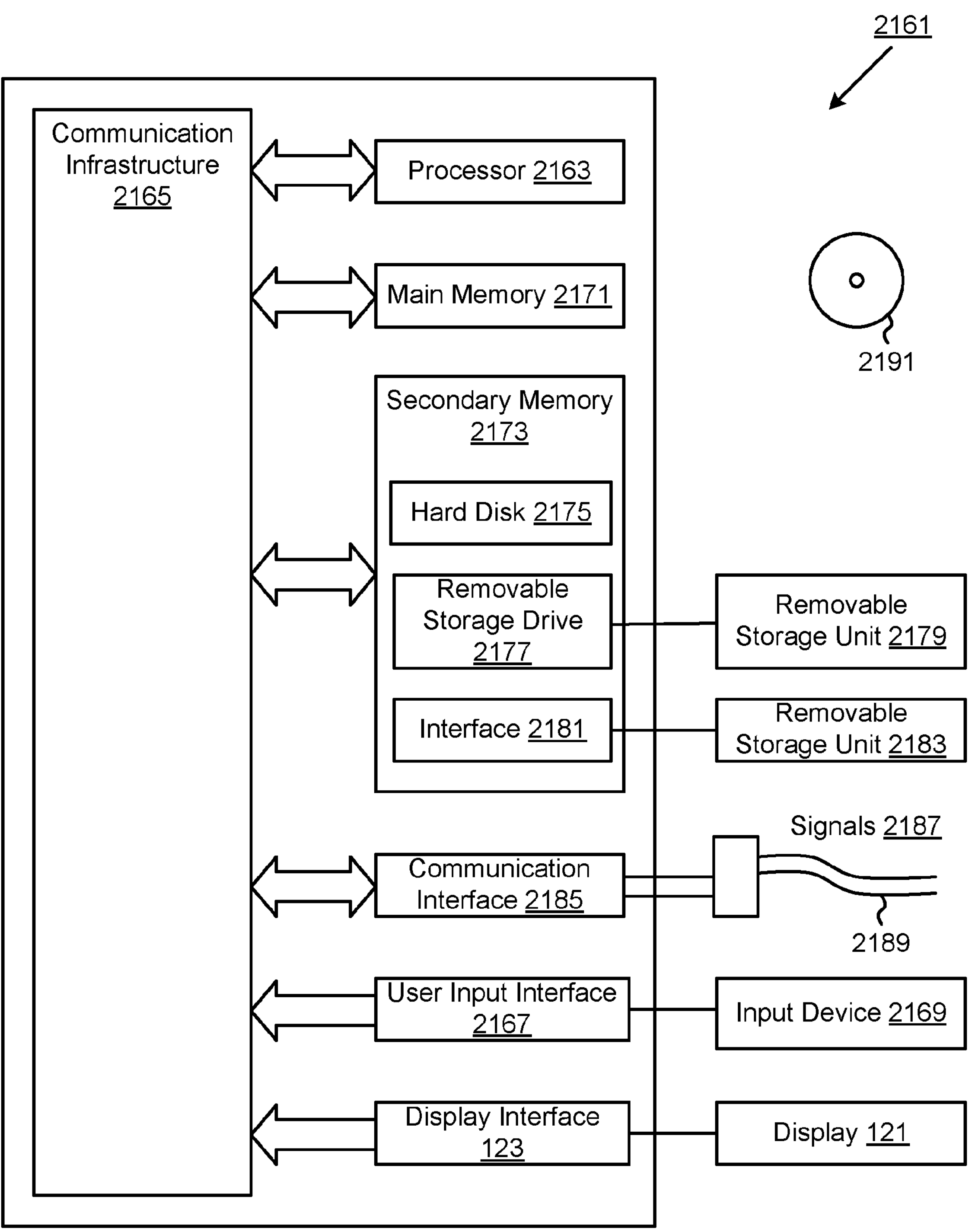
FIG. 21 is a diagram of an example of a computer system on which one or more of the functions of the embodiments may be implemented.

The entities described herein, such as the medical image processing system 101, 1401, 1801 and/or the device 103 may be implemented by one or more computer systems such as computer system 2161 as shown in FIG. 21. Embodiments of the present invention may be implemented as programmable code for execution by such computer systems 2161. After reading this description, it will become apparent to a person skilled in the art how to implement the invention using other computer systems and/or computer architectures.

Computer system 2161, which may be a personal computer, a laptop, a computing terminal, a smart phone, a tablet computer, or the like, includes one or more processors, such as processor 2163. Processor 2163 may be any type of processor, including but not limited to a special purpose or a general-purpose digital signal processor. Processor 2163 is connected to a communication infrastructure 2165 (for example, a bus or network). Various software implementations are described in terms of this exemplary computer system. After reading this description, it will become apparent to a person skilled in the art how to implement the invention using other computer systems and/or computer architectures.

Computer system 2161 also includes a user input interface 2163 connected to one or more input device(s) 2165 and the display interface 123 connected to one or more display(s) 121. Input devices 2165 may include, for example, a pointing device such as a mouse or touchpad, a keyboard, a touchscreen such as a resistive or capacitive touchscreen, etc. After reading this description, it will become apparent to a person skilled in the art how to implement the invention using other computer systems and/or computer architectures, for example using mobile electronic devices with integrated input and display components.

Computer system 2161 also includes a main memory 2171, preferably random access memory (RAM), and may also include a secondary memory 2173. Secondary memory 2173 may include, for example, a hard disk drive 2175 and/or a removable storage drive 2177, representing a floppy disk drive, a magnetic tape drive, an optical disk drive, etc. Removable storage drive 2177 reads from and/or writes to a removable storage unit 2179 in a well-known manner. Removable storage unit 2179 represents a floppy disk, magnetic tape, optical disk, etc., which is read by and written to by removable storage drive 2177. As will be appreciated, removable storage unit 2179 includes a computer usable storage medium having stored therein computer software and/or data.

In alternative implementations, secondary memory 2173 may include other similar means for allowing computer programs or other instructions to be loaded into computer system 2161. Such means may include, for example, a removable storage unit 2179 and an interface 2181. Examples of such means may include a program cartridge and cartridge interface (such as that previously found in video game devices), a removable memory chip (such as an EPROM, or PROM, or flash memory) and associated socket, and other removable storage units 2183 and interfaces 2181 which allow software and data to be transferred from removable storage unit 2179 to computer system 2161. Alternatively, the program may be executed and/or the data accessed from the removable storage unit 2179, using the processor 2163 of the computer system 2161.

Computer system 2161 may also include a communication interface 2185. Communication interface 2185 allows software and data to be transferred between computer system 2161 and external devices. Examples of communication interface 2185 may include a modem, a network interface (such as an Ethernet card), a communication port, a Personal Computer Memory Card International Association (PCMCIA) slot and card, etc. Software and data transferred via communication interface 2185 are in the form of signals 2187, which may be electronic, electromagnetic, optical, or other signals capable of being received by communication interface 2185. These signals 2187 are provided to communication interface 2185 via a communication path 2189. Communication path 2189 carries signals 2187 and may be implemented using wire or cable, fibre optics, a phone line, a wireless link, a cellular phone link, a radio frequency link, or any other suitable communication channel. For instance, communication path 2189 may be implemented using a combination of channels.

The terms "computer program medium" and "computer usable medium" are used generally to refer to media such as removable storage drive 2177, a hard disk installed in hard disk drive 2175, and signals 2187. These non-transitory computer program products are means for providing software to computer system 2161. However, these terms may also include signals (such as electrical, optical or electromagnetic signals) that embody the computer program disclosed herein.

Computer programs (also called computer control logic) are stored in main memory 2171 and/or secondary memory 2173. Computer programs may also be received via communication interface 2185. Such computer programs, when executed, enable computer system 2161 to implement embodiments of the present invention as discussed herein. Accordingly, such computer programs represent controllers of computer system 2161. Where the embodiment is implemented using software, the software may be stored in a computer program product 21845 and loaded into computer system 2161 using removable storage drive 2177, hard disk drive 2175, or communication interface 2185, to provide some examples.

Alternative embodiments may be implemented as control logic in hardware, firmware, or software or any combination thereof. For example, the trained layer prediction model 109 may be implemented in hardware and/or software as a standalone entity for installation and use as a component in a medical image processing system, and may further include the training module functionality and/or the augmented image generator functionality.

It will be understood that embodiments of the present invention are described herein by way of example only, and that various changes and modifications may be made without departing from the scope of the invention.

Reference in this specification to "one embodiment" are not necessarily all referring to the same embodiment, nor are separate or alternative embodiments mutually exclusive of other embodiments. In particular, it will be appreciated that aspects of the above discussed embodiments can be combined to form further embodiments. Similarly, various features are described which may be exhibited by some embodiments and not by others. Yet further alternative embodiments may be envisaged, which nevertheless fall within the scope of the following claims.

The invention claimed is:

1. A computer-implemented method for determining layer structure from medical image data, the method comprising:
- receiving, by a processing device, image data of biological layers captured by a medical imaging device; and
- determining, by the processing device, a boundary surface score for each pixel of the image data using a neural network, the boundary surface score being representative of a likelihood that each pixel corresponds to a boundary between segmented layers within the image data, to generate data defining boundary surfaces between segmented layers in the image data,
  - wherein the neural network includes first and second sub-networks connected in series, the first sub-network is configured with a multi-scale pooling layer that provides additional filters at respective defined sampling rates, and
  - wherein determining the boundary surface score includes:
    - using the first sub-network to process the image data to generate segmentation data identifying a plurality of tissue layers in the image data; and
    - using the second sub-network to process the segmentation data to identify boundary surfaces between the plurality of tissue layers.

2. The method of claim 1, further comprising generating an output image based on the image data and the identified boundary surfaces.

3. The method of claim 1, wherein the first sub-network comprises:
- an encoder path having a plurality of down-sampling pooling layers and the multi-scale pooling layer; and
- a decoder path that receives and processes output of the encoder path, the decoder path having a plurality of up-sampling pooling layers.

4. The method of claim 3, wherein the second sub-network comprises an encoder path having a plurality of down-sampling pooling layers that receives and processes output of the decoder path of the first sub-network.

5. The method of claim 4, wherein the encoder path of the second sub-network comprises a further multi-scale pooling layer.

6. The method of claim 4, wherein the second sub-network further comprises a decoder path that receives and processes output of the encoder path of the second sub-network, the decoder path of the second sub-network having a plurality of up-sampling pooling layers.

7. The method of claim 1, wherein the multi-scale pooling layer is an atrous spatial pyramid pooling layer including parallel filters with respective different scales defining a corresponding sampling rate.

8. The method of claim 1, further comprising training the first sub-network by determining updates to parameter values of the first sub-network based on a calculated difference between training segmentation maps and a segmentation map generated by the first sub-network.

9. The method of claim 8, wherein training the neural network further comprises determining updates to the parameter values of the first sub-network and initialised parameter values of the second sub-network together, based on a calculated difference between training boundary surface values and predicted boundary surface values generated by the second sub-network.

10. The method of claim 1, wherein training the neural network further comprises providing a third sub-network connected to the first sub-network, to output data identifying one or more additional features of the image data, wherein the first and third sub-networks are trained using back-propagation of a weighted combined loss calculated from the outputs of the third sub-network.

11. The method of claim 10, wherein training the neural network further comprises providing a fourth sub-network connected to the third sub-network, to output additional data identifying confounding features of the image data, wherein the first sub-network is trained using back-propagation of a weighted combined loss calculated from the outputs of the third sub-network with a penalty value derived from at least the outputs of the fourth sub-network.

12. The method of claim 1, further comprising generating a representation of reconstructed boundaries between the plurality of tissue layers using the determined boundary surface scores.

13. The method of claim 1, further comprising processing the determined boundary surface scores using a further trained classifier.

14. The method of claim 1, wherein the tissue layers are eye tissue layers captured by an optical coherence tomography device.

15. The method of claim 1, further comprising training the neural network by iterating through the following steps until optimised:

(i) train the first sub-network in isolation; and (ii) train the second sub-network, using trained weights of the first sub-network.

16. A method of training a neural network to determine layer structure from medical image data, the method comprising:

providing a first network to output data identifying one or more segmentation features in the medical image data, wherein the first network includes encoder and decoder sub-networks configured to receive and process the medical image data to generate a segmentation map;

providing a second network connected to the encoder sub-network of the first network, to output data identifying one or more additional pathological features of the medical image data;

wherein the first and second networks are trained using back-propagation of a weighted combined loss calculated from the outputs of at least the second network.

17. The method of claim 16, further comprising providing a third network to receive and process outputs from a multi-task network to generate additional data identifying confounding features in the medical image data.

18. The method of claim 17, wherein an adversarial network is connected in series to the multi-task network during training, and wherein weights of the multi-task network are optimised using a gradient of adversarial loss calculated with respect to at least the parameters in the multi-task network.

19. A system configured to perform the method of claim 1.

20. A non-transitory storage medium comprising machine readable instructions stored thereon for causing a computer system to perform a method in accordance with claim 1.

* * * * *